(12) United States Patent
Axmon et al.

(10) Patent No.: US 9,992,695 B2
(45) Date of Patent: Jun. 5, 2018

(54) METHODS AND APPARATUSES FOR PERFORMING MEASUREMENTS IN A WIRELESS NETWORK

(75) Inventors: Joakim Axmon, Kävlinge (SE); Muhammad Kazmi, Bromma (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 582 days.

(21) Appl. No.: 14/124,907

(22) PCT Filed: Jan. 19, 2012

(86) PCT No.: PCT/SE2012/050038
§ 371 (c)(1),
(2), (4) Date: Dec. 9, 2013

(87) PCT Pub. No.: WO2012/177203
PCT Pub. Date: Dec. 27, 2012

(65) Prior Publication Data
US 2014/0112180 A1    Apr. 24, 2014

Related U.S. Application Data

(60) Provisional application No. 61/499,685, filed on Jun. 21, 2011.

(51) Int. Cl.
*H04W 24/08* (2009.01)
*H04W 24/10* (2009.01)
*H04W 48/16* (2009.01)

(52) U.S. Cl.
CPC ........... *H04W 24/08* (2013.01); *H04W 24/10* (2013.01); *H04W 48/16* (2013.01)

(58) Field of Classification Search
None
See application file for complete search history.

(56) References Cited

U.S. PATENT DOCUMENTS

| 7,649,869 B2 * | 1/2010 | Mittal | H04W 24/10 370/252 |
| 2004/0047312 A1 * | 3/2004 | Muszynski | H04W 36/30 370/331 |

(Continued)

FOREIGN PATENT DOCUMENTS

| CN | 101682853 A | 3/2010 |
| EP | 2724561 B1 | 12/2016 |

(Continued)

OTHER PUBLICATIONS

Author Unknown, "3rd Generation Partnership Project; Technical Specification Group Radio Access Network; Evolved Universal Terrestrial Radio Access (E-UTRA); Physical Channels and Modulation (Release 10)," Technical Specification 36.211, 3GPP Organizational Partners, Jun. 2011, Version 10.2.0, 103 pages.

(Continued)

*Primary Examiner* — Ayaz Sheikh
*Assistant Examiner* — Faiyazkhan Ghafoerkhan
(74) *Attorney, Agent, or Firm* — Withrow & Terranova, PLLC

(57) ABSTRACT

Embodiments herein relate to a user equipment, UE, configured to performing measurements in a wireless communication network. The UE acquires system information, SI, of a cell during autonomous gaps, and also performs at least one non-SI measurement related to a serving and/or to one or more neighbor cells during a time period comprising the autonomous gaps. The embodiments also relate to a serving network node, a target network node and respective method therein.

30 Claims, 14 Drawing Sheets

(56) References Cited

U.S. PATENT DOCUMENTS

| | | | | |
|---|---|---|---|---|
| 2007/0037601 | A1* | 2/2007 | Mittal | H04W 24/10 455/525 |
| 2008/0085710 | A1* | 4/2008 | Prateek | H04L 43/16 455/436 |
| 2008/0267309 | A1* | 10/2008 | Saini | H04W 48/10 375/267 |
| 2009/0135787 | A1 | 5/2009 | Uemura et al. | |
| 2010/0159950 | A1* | 6/2010 | Toh | H04J 11/0086 455/456.1 |
| 2010/0260156 | A1* | 10/2010 | Lee | H04W 56/0035 370/336 |
| 2010/0309803 | A1* | 12/2010 | Toh | H04L 1/0006 370/252 |
| 2011/0105112 | A1 | 5/2011 | Cave et al. | |
| 2012/0088516 | A1* | 4/2012 | Ji | H04L 1/0027 455/452.1 |
| 2012/0099569 | A1* | 4/2012 | Sabol | H04W 72/0426 370/338 |
| 2012/0113961 | A1* | 5/2012 | Krishnamurthy | H04L 1/0026 370/332 |
| 2012/0157082 | A1* | 6/2012 | Pedersen | H04W 24/10 455/422.1 |
| 2012/0157090 | A1* | 6/2012 | Kim | H04W 24/08 455/424 |
| 2012/0190373 | A1* | 7/2012 | Tenny | H04W 56/0015 455/447 |
| 2012/0244903 | A1* | 9/2012 | Fong | H04W 8/20 455/517 |
| 2012/0252487 | A1* | 10/2012 | Siomina | H04W 24/10 455/456.1 |
| 2013/0028126 | A1* | 1/2013 | Kazmi | H04W 36/0088 370/252 |
| 2013/0028199 | A1* | 1/2013 | Song | H04W 16/12 370/329 |
| 2013/0039342 | A1* | 2/2013 | Kazmi | H04W 48/16 370/331 |
| 2013/0059610 | A1* | 3/2013 | Siomina | H04W 24/10 455/456.6 |
| 2013/0229933 | A1* | 9/2013 | Ji | H04L 1/0027 370/252 |
| 2013/0229971 | A1* | 9/2013 | Siomina | H04W 24/10 370/312 |
| 2013/0308481 | A1* | 11/2013 | Kazmi | H04W 24/02 370/252 |
| 2014/0112180 | A1* | 4/2014 | Axmon | H04W 24/10 370/252 |

FOREIGN PATENT DOCUMENTS

| | | | | |
|---|---|---|---|---|
| WO | 2007022127 | A2 | 2/2007 | |
| WO | WO 2007022127 | A2 * | 2/2007 | H04W 24/10 |
| WO | WO 2007022127 | A3 * | 4/2007 | H04W 24/10 |
| WO | 2011041754 | A1 | 4/2011 | |
| WO | WO 2011041754 | A1 * | 4/2011 | H04W 8/20 |
| WO | 2011126420 | A1 | 10/2011 | |

OTHER PUBLICATIONS

Author Unknown, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Technical Specification 37.320, 3GPP Organizational Partners, Jun. 2011, Version 10.2.0, 17 pages.

Author Unknown, "3rd Generation Partnership Project; Technical Specification Group Radio Access Network; Evolved Universal Terrestrial Radio Access (E-UTRA); Radio Resource Control (RRC); Protocol specification (Release 10)," Technical Specification 36.331, 3GPP Organizational Partners, Jun. 2011, Version 10.2.0, 294 pages.

Author Unknown, "3rd Generation Partnership Project; Technical Specification Group Radio Access Network; Evolved Universal Terrestrial Radio Access Network (E-UTRAN); X2 application protocol (X2AP) (Release 10)," Technical Specification 36.423, 3GPP Organizational Partners, Mar. 2011, Version 10.1.0, 132 pages.

International Search Report and Written Opinion for PCT/SE2012/050038, dated May 21, 2012, 13 pages.

Written Opinion for PCT/SE2012/050038, dated Aug. 12, 2013, 7 pages.

Author Unknown, "3rd Generation Partnership Project: [67#26] LTE: Inbound Mobility (R2-095922)", 3rd Generation Partnership Project (3GPP TSG-RAN WG2#67bis), Oct. 12-16, 2009, 50 pages, Miyazaki, Japan.

Decision on Grant for Russian Patent Application No. 2014101630/07(002364), dated Apr. 5, 2016, 28 pages.

Nokia Siemens Networks, et al., "R2-100546: Reporting of HNB System Information," 3rd Generation Partnership Project (3GPP), TSG-RAN WG2 Meeting #68bis, Jan. 18-22, 2010, 5 pages, Valencia, Spain.

Official Action for Russian Patent Application No. 2014101630/07(002364), dated Sep. 3, 2015, 9 pages.

Samsung, "R4-100036: Consideration on the HeNB inbound mobility simulation assumptions," 3rd Generation Partnership Project (3GPP), TSG RAN WG4 Meeting Ad Hoc #1, Jan. 18-22, 2010, 3 pages, Sophia-Antipolis, France.

International Preliminary Report on Patentability for International Patent Application No. PCT/SE2012/050038, completed Oct. 2, 2013, 7 pages.

First Office Action for Chinese Patent Application No. 201280030482.4, dated Oct. 9, 2016, 19 pages.

Motorola (Rapporteur), "R2-095922: [67#26] LTE: Inbound mobility," 3rd Generation Partnership Project (3GPP), TSG-RAN WG2#67bis, Oct. 12-16, 50 pages, Miyazaki, Japan.

Motorola, "R4-104647: Downlink Performance in the Presence of Interference from ABSFs," 3rd Generation Partnership Project (3GPP), TSG-RAN WG4 Meeting #57, Nov. 15-19, 2010, 8 pages, Jacksonville, USA.

Extended European Search Report for European Patent Application No. 16197040.5, dated Feb. 24, 2017, 7 pages.

* cited by examiner

| Config. | RV sequence | RV distance | Full acquisition time TTI |
|---|---|---|---|
| 0 | A, B, C, D * | 20 ms | 80 ms |
| 1 | A, B, C, D ** | 40 (60) ms | 180 ms |
| 2 | A, B, C, D * | 60 ms | 240 ms |
| 3 | A, B, C, D * | 100 ms | 400 ms |

Four redundancy versions labeled A, B, C and D.
* Four permutations exist
** Several permutations and "switching points" exist

Fig. 3

▨ Target cell subframe to receive

▦ Gap created in source cell

METHODS AND APPARATUSES FOR PERFORMING MEASUREMENTS IN A WIRELESS NETWORK

This application is a 35 U.S.C. § 371 national phase filing of International Application No. PCT/SE2012/050038, filed Jan. 19, 2012, the disclosure of which is incorporated herein by reference in its entirety.

TECHNICAL FIELD

The present disclosure relates to measurements in wireless networks, in particular to a user equipment and method therein for acquiring system information and performing measurements in a wireless network. The present disclosure also relates to network nodes and methods in said network nodes.

BACKGROUND

The interest in deploying low-power nodes, such as pico base stations, home eNodeBs, relays, remote radio heads, etc., for enhancing the macro network performance in terms of the network coverage, capacity and service experience of individual users has been constantly increasing over the last few years. At the same time, there has been realized a need for enhanced interference management techniques to address the arising interference issues caused, for example, by a significant transmit power variation among different cells and cell association techniques developed earlier for more uniform networks In 3rd Generation Partnership Project, 3GPP, heterogeneous network deployments have been defined as deployments where low-power nodes of different transmit powers are placed throughout a macro-cell layout, implying also non-uniform traffic distribution. Such deployments are, for example, effective for capacity extension in certain areas, so-called traffic hotspots, i.e. small geographical areas with a higher user density and/or higher traffic intensity where installation of pico nodes can be considered to enhance performance. Heterogeneous deployments may also be viewed as a way of densifying networks to adopt for the traffic needs and the environment. However, heterogeneous deployments bring also challenges for which the network has to be prepared to ensure efficient network operation and superior user experience. Some challenges are related to the increased interference in the attempt to increase small cells associated with low-power nodes, also known as cell range expansion; the other challenges are related to potentially high interference in uplink due to a mix of large and small cells.

According to 3GPP, heterogeneous deployments consist of deployments where low power nodes are placed throughout a macro-cell layout. User equipments, UEs, being served by a low power radio base station are generally said to belong to a Closed Subscriber Group, CSG, for that particular low power radio base station. The interference characteristics in a heterogeneous deployment can be significantly different than in a homogeneous deployment, in downlink or uplink or both. Examples hereof are given in FIG. 1.

FIG. 1 illustrates a macro radio base station 100 having a coverage area 101, generally known as a cell 101. A cell of a macro radio base station is also referred to as a macro cell. Within the cell 101 of the macro radio base station, three low power radio base stations 110, 120 and 130 are deployed. The low power radio base stations have a respective associated cell 111, 121 and 131, also referred to a low power cells. FIG. 1 further illustrates one UE 115, 125 and 135 being present in each of the low power cells 111, 121 and 131. The UEs 115 and 125 in FIG. 1 are both being served by the macro radio base station 100 even though the UEs are located within the cells 111 and 121, and the UEs are referred to as macro UEs. This means that the UEs 115 and 125 have no access to the respective CSGs of the respective low power radio base stations 110 and 120. UE 135 belongs to a CSG of low power radio base station 130 and is hence not being served by the macro radio base station 100, and the UE 135 is referred to as a CSG UE. In FIG. 1, in case (a) the macro UE 115 will be interfered by the low power radio base station 110 when being served by the macro radio base station 100. In case (b) the UE 125 causes severe interference towards the low power radio base station 120, and in case (c), the CSG UE 135 is interfered by the low power radio base station 120. In some examples, a low power radio base station may also be referred to as a HeNB, short for Home eNode B. Other examples of low power nodes are pico base station, micro base station, and medium-range base station. The low-power nodes may or may not operate in the CSG mode.

Another challenging interference scenario occurs with so-called cell range expansion, when the traditional downlink cell assignment rule diverges from the Reference Signal Received Power, RSRP, based approach, e.g. towards pathloss or path gain based approach, e.g., when adopted for radio base stations with a transmit power lower than that of a neighbour radio base station. The idea of the cell range expansion is illustrated in FIG. 2 where the cell range expansion of a low power cell is implemented by means of a delta-parameter and the UE 115, 125, 135 potentially can "see" a larger low power cell coverage area when a positive delta-parameter is used in cell selection/reselection. The cell range expansion is limited by the downlink, DL, performance since uplink, UL, performance typically improves when the cell sizes of neighbour cells become more balanced.

To ensure reliable and high bit rate transmissions as well as robust control channel performance, maintaining a good signal quality is a must in wireless networks. The signal quality is determined by the received signal strength and its relation to the total interference and noise received by the receiver. A good network plan, which, among the others also includes cell planning, is a prerequisite for the successful network operation, but it is static. For more efficient radio resource utilization, it has to be complemented at least by semi-static and dynamic radio resource management mechanisms, which are also intended to facilitate interference management, and deploying more advanced antenna technologies and algorithms.

One way to handle interference is, for example, to adopt more advanced transceiver technologies, e.g. by implementing interference cancellation mechanisms in terminals. Another way, which can be complementary to the former, is to design efficient interference coordination algorithms and transmission schemes in the network. The coordination may be realized in static, semi-static or dynamic fashion. Static or semi-static schemes may rely on reserving time-frequency resources (e.g., a part of the bandwidth and/or time instances) that are orthogonal for strongly interfering transmissions. Dynamic coordination may be implemented e.g. by means of scheduling. Such interference coordination may be implemented for all or specific channels (e.g., data channels or control channels) or signals.

For heterogeneous deployments, there have been standardized enhanced inter-cell interference coordination (eICIC) mechanisms for ensuring that the UE subject to high interference is able to perform at least some measurements (e.g. Radio Resource Management, RRM, Radio Link Monitoring, RLM, and Channel State Information, CSI, measurements) in special low-interference subframes. These mechanisms involve configuring patterns of reduced power and/or reduced activity subframes (also referred to Almost Blank Subframes, ABS) at transmitting nodes and configuring measurement patterns for UEs.

Two types of patterns have been defined for eICIC to enable restricted measurements in DL: restricted measurement patterns, which are configured by a network node and signalled to the UE; and transmission patterns (also known as ABS patterns), which are configured by a network node, describe the transmission activity of a radio node, e.g. a radio base station, and may be exchanged between the radio nodes In general, in Long Term Evolution, LTE, the UL interference is coordinated by means of scheduling and UL power control, where the UE transmit power is configured to meet a certain Signal to Noise Ratio, SNR, target which may be further fine tuned by a few other related parameters. Both scheduling and UL power control allow for coordinating the UL interference in time, frequency and space.

It is mandatory for all UEs to support all intra-Radio Access Technology, RAT, measurements (i.e. inter-frequency and intra-band measurements) and meet associated requirements. However the inter-band and inter-RAT measurements are UE capabilities, which are reported to the network during the call setup. The UE supporting certain inter-RAT measurements should meet the corresponding requirements. For example a UE supporting LTE and Wideband Code Division Multiple Access, WCDMA, should support intra-LTE measurements, intra-WCDMA measurements and inter-RAT measurements (i.e. measuring WCDMA when serving cell is LTE and measuring LTE when serving cell is WCDMA). Hence a communication network can use these capabilities according to its strategy. These capabilities are highly driven by factors such as market demand, cost, typical network deployment scenarios, frequency allocation, etc.

The UE may be configured to perform positioning measurements. For example, for UE-assisted Observed Time Difference of Arrival, OTDOA, positioning, the UE receives assistance data from a positioning node (e.g. Evolved Serving Mobile Location Centre, E-SMLC, in LTE), where the assistance data comprises a list of cells, including a reference cell, for which the UE will perform Reference Signal Time Difference, RSTD, measurements and report the measurements to the positioning node.

To enable positioning in LTE and facilitate positioning measurements of a proper quality and for a sufficient number of distinct locations, physical signals dedicated for positioning (Positioning Reference Signals, or PRSs [3GPP TS 36.211]) have been introduced and low-interference positioning subframes have been specified by 3GPP.

PRS are transmitted from one antenna port (R6) according to a pre-defined pattern. A frequency shift, which is a function of Physical Cell Identity, PCI, can be applied to the specified PRS patterns to generate orthogonal patterns and modelling the effective frequency reuse of six, which makes it possible to significantly reduce neighbour cell interference on the measured PRS and thus improve positioning measurements. Even though PRS have been specifically designed for positioning measurements and in general are characterized by better signal quality than other reference signals, the standard does not mandate using PRS. Other reference signals, e.g. cell-specific reference signals (CRS) may also be used for positioning measurements, although no requirements are defined for CRS-based RSTD measurements.

PRS are transmitted in pre-defined positioning subframes grouped by several consecutive subframes ($N_{PRS}$), i.e. one positioning occasion. Positioning occasions occur periodically with a certain periodicity of $T_{PRS}$ subframes, i.e. the time interval between two positioning occasions. The standardized periods $T_{PRS}$ are 160, 320, 640, and 1280 ms, and the number of consecutive subframes may be 1, 2, 4, or 6. The positioning occasion configuration parameters the UE receives in the OTDOA assistance data signalled by the network. It is up to the network to ensure low-interference conditions in the positioning subframes configured for UE RSTD measurements.

For each cell in the assistance data, the UE will perform RSTD measurements in the indicated positioning subframes that contain PRS. For CRS-based RSTD measurements in heterogeneous network, the UE may perform measurements in the restricted positioning subframes if the corresponding patterns are known to the UE.

When the UE is configured with inter-frequency RSTD measurements, the positioning measurement occasions may be further restricted by measurement gap patterns. For inter-frequency RSTD measurements, measurements gap pattern #0, where measurement gaps are repeated every 40 ms period, has to be configured by the network.

In LTE, the following Enhanced Cell Id, E-CID, positioning measurements may be performed by the UE: RSRP measurements for serving and neighbour cells; Reference Signal Received Quality, RSRQ, measurements for serving and neighbour cells; and UE Reception-Transmission, Rx-Tx, timing difference measurements for the serving cell or serving radio base station. Given that the above measurements are performed on CRS, in heterogeneous deployments the UE is likely to perform these measurements also in the restricted measurement subframes configured by eICIC.

The radio base station, or eNodeB in LTE, may also perform E-CID measurements, e.g. eNodeB Rx-TX (Timing Advance Type 1), Timing advance Type 2 and Angle of Arrival, AoA, measurements. Note that Timing Advance measurements are also used for configuring UE timing adjustment for general operation, i.e., not related to positioning.

Some positioning measurements such as UE Rx-Tx time difference, eNodeB Rx-Tx time difference, Timing Advance, TA, AoA, Uplink Time Difference of Arrival, UTDOA measurements, etc. require measurements on the uplink transmitted signals (e.g. Sounding Reference Signals, SRS, demodulation reference signals, UE-specific reference signals or channels (e.g. Random Access Channel, RACH).

In Evolved Universal Mobile Telephone System Terrestrial Radio Access, E-UTRAN, the serving cell or the serving radio base station can request the UE to acquire the cell global identifier, CGI, which uniquely identifies a cell, of a cell or target cell. In order to acquire the CGI of the target cell, the UE has to read at least part of the system information, SI, including master information block, MIB, and the relevant system information block, SIB. The reading of SI for the acquisition of CGI is carried out during measurement gaps which are autonomously created by the UE. These UE created gaps are also referred to as autonomous gaps.

The UE created autonomous gaps may adversely affect several different measurements that the UE is required to perform.

For example, in case the autonomous gaps overlap with positioning measurements, the positioning performance may be degraded or, in worst case, the positioning will fail. This may happen since the periodicity of positioning occasions is relatively long (160, 320, 640, 1280 ms), which results in that positioning measurements occasions are sparse in time, which impacts the RSTD measurement reporting time, but also the RSTD measurement accuracy.

In another example, the E-CID measurements, e.g. UE Rx-Tx, eNodeB Rx-Tx or RSRP/RSRQ, performed at specific measurement patterns, e.g. in subframes indicated for measurement by eICIC restricted measurement pattern, will degrade if the measurement occasions will collide with UE-configured autonomous gaps, in particular for patterns with low blanking rate i.e. when the number of measurement occasions indicated by the pattern is relatively small.

In yet another example, the accuracy of the UE timing advance, which is a function of the UE and eNodeB Rx-Tx time difference measurements, may be degraded due to improper configuration of autonomous gaps.

In still another example, the minimum RLM and RRM requirements with eICIC are specified for restricted measurement patterns with low blanking rate ($1/10$, i.e. 1 out of 10 subframes in a frame is a low-interference subframe configured for the measurement). Autonomous gaps colliding with the sparse measurement occasions indicated by the restricted measurement pattern will degrade the RLM/RRM measurement performance due to a further reduced number of measurement possibilities.

In yet an example, the autonomous gaps are also created in the uplink when the UE reads the SI. Hence performance of the measurements (e.g. UE or eNodeB time difference measurements) which involve measurement on signals transmitted in the uplink when UE is reading SI can be deteriorated. In case the UL restricted subframes (or time-frequency resources) are used for uplink measurements, the impact of autonomous gaps on the measurement may be even severe. For example the collision or overlapping of the autonomous gaps with the UL restricted sub-frames (or time-frequency resources) may result in bad measurement performance.

SUMMARY

The object is to obviate at least some of the problems outlined above. In particular, it is an object to provide a user equipment, UE, a serving network node, a target network node and respective method therein for performing measurements in a wireless communication network.

According to an aspect a method in a UE for performing measurements in a wireless communication network is provided. The method comprises acquiring system information, SI, of a cell during autonomous gaps created by the UE and performing at least one non-SI measurement related to a serving and/or to one or more neighbour cells during a time period comprising the autonomous gaps.

According to an aspect, a method in a serving network node for configuring measurements performed by a UE is provided. The method comprises requesting the UE to acquire system information, SI, of a cell during autonomous gaps created by the UE. The method further comprises scheduling non-SI measurement subframes in order to avoid collision between the non-SI measurement subframes and the UE created autonomous gaps.

According to yet an aspect, a method in a target network node for enabling a UE to acquire System Information, SI, is provided, wherein the target network node associated to a cell from which the UE is requested to acquire the SI is any one of: an UTRAN network node, E-UTRAN network node, GSM network node, CDMA2000 network node or multi-standard radio base station. The method comprises receiving information that the UE is attempting to acquire a SIB and determining to minimise the impact of SIB scheduling on SI acquisition for the UE by: using a single or a minimum number of segments to transmit the SIB, wherein if more than one segment is used to transmit the SIB, then the method comprises transmitting the segments at System Frame Number, SFN, offsets that enable the UE to catch up non-SI measurements in between; and/or using a SIB repetition period that enables the UE to catch up non-SI measurements in between reception of the SIB or segments thereof.

According to still an aspect, a UE adapted to perform measurements in a wireless communication network is provided. The UE comprises an acquisition unit adapted to acquire system information, SI, of a cell during autonomous gaps created by the UE, and to perform at least one non-SI measurement related to a serving and/or to one or more neighbour cells during a time period comprising the autonomous gaps.

According to yet an aspect, a serving network node adapted to configure measurements performed by a UE is provided. The serving network node comprises a requesting unit adapted to request the UE to acquire system information, SI, of a cell during autonomous gaps created by the UE. The serving network node further comprises a scheduler adapted to schedule non-SI measurement subframes in order to avoid collision between the non-SI measurement subframes and the UE created autonomous gaps.

According to still an aspect, a target network node adapted to enable a UE to acquire System Information, SI, is provided, wherein the target network node associated to a cell from which the UE is requested to acquire the SI is any one of: an UTRAN network node, E-UTRAN network node, GSM network node, CDMA2000 network node or multi-standard radio base station. The target network node comprises a receiving unit adapted to receive information that the UE may attempt to acquire a SIB and the target network node comprising a processing unit adapted to determine to minimise the impact of SIB scheduling on SI acquisition for the UE by using a single or a minimum number of segments to transmit the SIB, wherein if more than one segment is used to transmit the SIB, then the processing unit is adapted to transmit the segments at System Frame Number, SFN, offsets that enable the UE to catch up non-SI measurements in between; and/or using a SIB repetition period that enables the UE to catch up non-SI measurements in between reception of the SIB or segments thereof.

The UE, the serving network node, the target network node and the respective method performed therein have several advantages. The performance of DL measurements may be improved when autonomous gaps are used by the UE and restricted measurements are configured. Also performance of UL measurements may be improved when autonomous gaps are used by the UE and restricted measurements are configured. Further, the radio node configuration facilitating UE measurements when the UE uses autonomous gaps and restricted measurements are configured may be improved.

BRIEF DESCRIPTION OF DRAWINGS

Embodiments will now be described in more detail in relation to the accompanying drawings, in which:

FIG. 3 is a table illustrating SIB1 acquisition with a full set of redundancy versions.

DETAILED DESCRIPTION

Figure 1A:
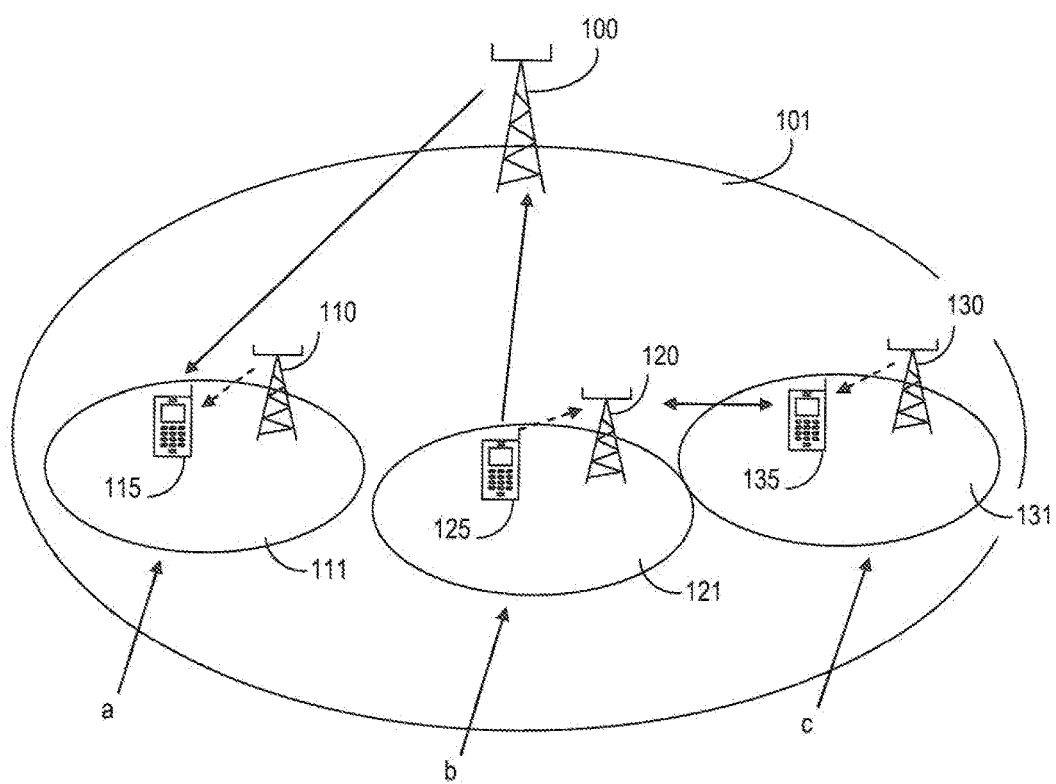
FIG. 1a is a schematic illustration of different examples of interference scenarios in Heterogeneous communication networks.
Figure 1B:
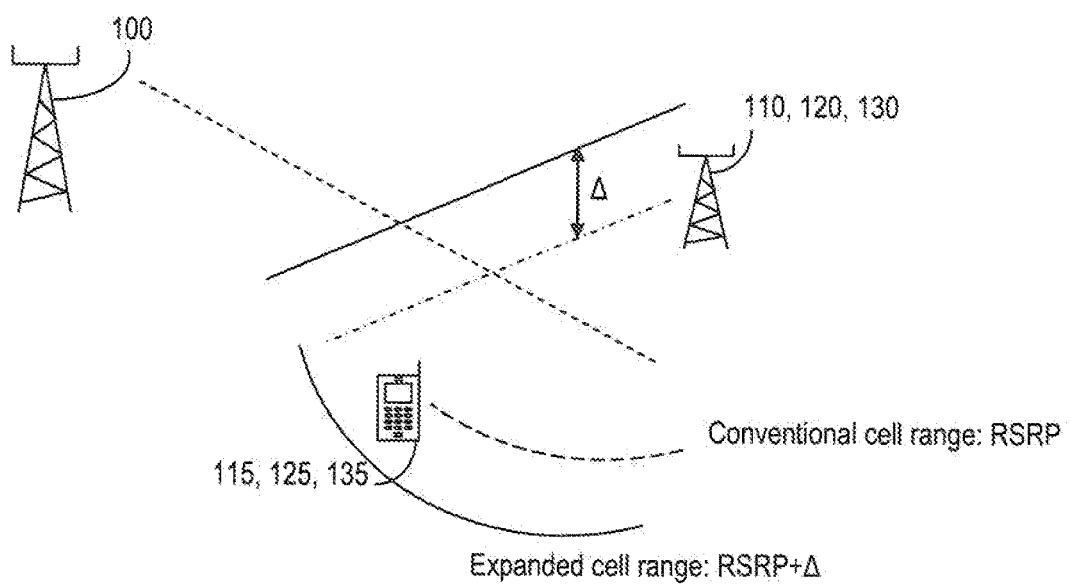
FIG. 1b is a schematic illustration of cell expansion of a low power radio base station.

Briefly described, a method in a UE for performing measurements in a wireless communication network, a method in a serving network node for configuring measurements performed by a UE accordingly and a method in a target network node for enabling a UE to acquire SI as well as corresponding arrangements are provided. Corresponding UE, serving network node and target network node are also provided.

The methods disclosed in this disclosure are described with more focus on heterogeneous deployments, which shall not be viewed as a limitation of the embodiments, nor be limited to the 3GPP definition of heterogeneous network deployments. For example, the methods could be well adopted also for traditional macro deployments and/or networks operating more than one radio access technology, RAT. Further, although the embodiments are mainly described for autonomous gaps created in DL, the invention may also be applied to UL.

Restricted measurement patterns (or simply measurement patterns) and restricted measurement subframes described in many embodiments shall be understood in a general sense, i.e., not limited to eICIC patterns, but can be understood as relatively sparse occasions for at least one UE measurement where the occasions may be directly or indirectly configured by the network. The restricted measurement occasions may be sparse in time either due to sparse in time transmissions of the measured signals, e.g. according to a transmission pattern such as positioning subframe configuration, due to that measuring in other time occasions may lead to poor measurement performance, e.g., due to high interference, or due to configuring a measurement gap pattern or any other restriction that may be described by a pattern. Restricted measurement pattern applies in general to time-frequency resources, e.g. restricted in time over the entire bandwidth, restricted in frequency or both. Further, such patterns may refer to intra-frequency, inter-frequency or inter-RAT patterns.

Transmission patterns are the patterns indicating relatively sparse in time channel/signal transmissions in a cell. Examples are ABS patterns for eICIC, which have been standardized for DL, but may also be standardized for UL in the future. So, at least in some embodiments, ABS is referred to either DL ABS or UL ABS.

The signalling described in the invention is either via direct links or logical links, e.g. via higher layer protocols and/or via one or more network nodes. For example, in LTE in the case of signalling between E-SMLC and Location Services, LCS, client the positioning result may be transferred via multiple nodes. Another example is when signalling from a coordinating node passes another network node, e.g. a radio node.

Although the description is given for UE, as a measuring unit, it should be understood by the skilled in the art that "UE" is a non-limiting term which means any wireless device or node, e.g. PDA, laptop, mobile, sensor, fixed relay, mobile relay or even a radio base station capable of performing measurements in DL. The embodiments may apply also for Carrier Aggregation, CA, capable UE, in its general sense, as described above.

A cell is associated with a radio node, where a radio node or radio network node or eNodeB (or eNB) used interchangeably in the description, comprises in a general sense any node transmitting radio signals used for measurements, e.g. eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node which may e.g. support multi-standard radio, MSR, or may operate in a mixed mode.

The term "coordinating node" used herein is a network node which may also be a radio network node which coordinates radio resources with one or more radio network nodes. A coordinating node may also be a gateway node. Examples of the coordinating node may be a Self Organising Network, SON, node, a Minimisation of Drive Tests, MDT, node, an Operation and Maintenance, O&M, node, eNodeB node, femto gateway, etc. The coordinating node may, e.g., coordinate and/or distribute the information to the nodes under its responsibility about e.g. scheduling, ABS or restricted measurement patterns, as described later in embodiments.

The embodiments are not limited to LTE, but may apply with any RAN, single- or multi-RAT. Some other RAT examples are LTE-Advanced, UMTS, GSM, cdma2000, WiMAX, and WiFi. Note that E-UTRA FDD and TDD may also be considered as different RATs.

Figure 2A:
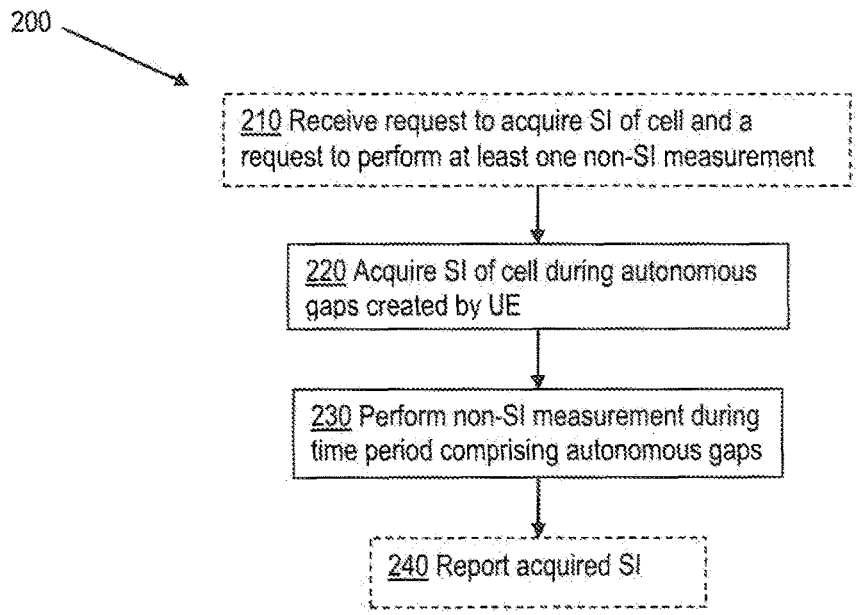
FIG. 2a is a flowchart of a method in a UE for performing measurements in a wireless communication network according to an embodiment.

FIG. 2a is a flowchart of a method in a UE for performing measurements in a wireless communication network according to an embodiment.

FIG. 2a illustrates the method comprising acquiring 220 system information, SI, of a cell during autonomous gaps created by the UE and performing 230 at least one non-SI measurement related to a serving and/or to one or more neighbour cells during a time period comprising the autonomous gaps.

When the UE is to acquire the SI of a cell, or a target cell, the UE creates autonomous gaps. The autonomous gaps allow the UE to acquire the SI of the cell. A radio base station transmits different parts of SI at pre-determined time instances on different channels depending on the Radio Access Technology, RAT. This means that not all the SI of the cell is transmitted by the radio base station at one time instance. Typically, in order to acquire the SI of the cell, the UE will have to listen or read the SI over a time period comprising a plurality of autonomous gaps, wherein the autonomous gaps are arranged in time such that they overlap, in time, when the parts of the SI is transmitted. This will be more described with reference to FIGS. 4a to 5b below.

The radio base station also transmits different parts of non-SI at different instances in time. According to this embodiment, the UE also performs at least one non-SI measurement related to a serving and/or to one or more neighbour cells during a time period comprising the autonomous gaps. This means that the time period comprises at least two autonomous gaps. As a consequence, the UE will perform the at least one non-SI measurement related to a serving and/or to one or more neighbour cells in-between autonomous gaps.

In this manner, the UE attempts to avoid puncturing of restricted subframes when the UE carries out SI acquisition using autonomous gaps, and/or attempts to spread out the puncturing over time in such manner that the measurements that are blocked by the autonomous gaps can catch up before the next puncturing occurs. This allows for either an avoided or graceful degradation of the concerned measurements compared to e.g. legacy terminal SI acquisition using autonomous gaps.

This embodiment has several advantages. The performance of DL measurements are improved when autonomous gaps are used by the UE and restricted measurements are configured. Also performance of UL measurements are improved when autonomous gaps are used by the UE and restricted measurements are configured. Further, the radio node configuration facilitating UE measurements when the UE uses autonomous gaps and restricted measurements are configured may be improved.

According to an embodiment, acquiring the SI comprises receiving 221 at least one of: a Master Information Block, MIB, and a System Information Block, SIB, of the cell.

Depending of the RAT of the cell from which the UE acquires the SI, the SI may be transmitted on different channels, in different manner and in different blocks. For example, if the RAT of the cell from which the UE acquires the SI is E-UTRA, the MIB is transmitted as four self-decodable blocks (in good radio conditions) over a Transmission Time Interval, TTI, of 40 ms. Each block is transmitted at a prior known subframe over the central 72 subcarriers of a cell, in a prior known set of Orthogonal Frequency Division Multiplexing, OFDM, symbols. The MIB content is such that if multiple blocks are to be combined in order to improve the reception, all of those have to be from the same 40 ms TTI. For example, if the requirements on SI acquisition using autonomous gaps are based on that at most 3 blocks need to be combined, then 5 blocks may be collected, out of which it is guaranteed that 3 blocks will be from the same 40 ms period (this is also an System Frame Number, SFN, acquisition). The MIB is transmitted in the second slot of the first subframe every radio frame.

Furthermore, in E-UTRA, the SIB1 (system information block type 1)—which contains information about PLMN, the CGI and access rights—is transmitted as 4 redundancy versions over a TTI of 80 ms. It is transmitted in prior known subframes but may be distributed anywhere in frequency. The contents of the SIB1 remain constant during what is known as a modification period. The least modification period is two times the shortest paging cycle, i.e., 640 ms.

In LTE the UE reads the MIB and SIB1 of the target cell E-UTRAN cell to acquire its CGI, also known as ECGI when the target cell is E-UTRAN intra- or inter-frequency. The MIB includes a limited number of most essential and most frequently transmitted parameters that are needed to acquire other information from the cell, and is transmitted on the Broadcast Channel, BCH. In particular, the following information is currently included in MIB: DL bandwidth, Physical HARQ Indication Channel, PHICH configuration, and SFN.

The MIB is transmitted periodically with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SIB1_contains, e.g., the following information: PLMN identity, cell identity, CSG identity and indication, frequency band indicator, SI-window length, and scheduling info for other SIBs. The SIB1 may also indicate whether a change has occurred in the SI messages. The UE is notified about coming change in the SI by a paging message, from which it will know that the system information will change at the next modification period boundary. The modification period boundaries are defined by SFN values for which SFN mod m=0, where m is the number of radio frames comprising the modification period. The modification period is configured by system information.

In LTE, the SIB1, as well as other SIB messages, is transmitted on DL-SCH. The SIB1 is transmitted with a periodicity of 80 ms and repetitions made within 80 ms. The first transmission of SIB1 is scheduled in subframe #5 of radio frames for which the SFN mod 8=0, and repetitions are scheduled in subframe #5 of all other radio frames for which SFN mod 2=0.

The UE is required to report the intra-frequency ECGI within about 150 ms from a target intra-frequency cell provided its SINR is at least −6 dB or higher. During the acquisition of the target cell's ECGI on the serving carrier frequency the UE is allowed to create autonomous gaps in the downlink and uplink. Under continuous allocation the UE is required to transmit certain number of ACK/NACK on the uplink to ensure that the UE does not create excessive gaps.

The UE is required to report the inter-frequency ECGI also within about 150 ms from a target inter-frequency cell provided its SINR is at least −4 dB or higher. During the acquisition of the target cell's ECGI on the serving carrier frequency the UE is allowed to create autonomous gaps in the downlink and uplink. This causes UE to interrupt downlink reception and uplink transmission in the serving cell. Under continuous allocation the UE is also required to transmit certain number of ACK/NACK on the uplink to ensure that the UE does not create excessive gaps.

In UTRAN, the target cell's CGI acquisition is much longer e.g. more than 1 second depending upon the periodicity of the SIB3, which contains the CGI. Furthermore due to the autonomous gaps created by the UE to acquire the target cell's CGI, the interruption of the data transmission and reception from the serving cell can be 600 ms or longer.

In case of inter-RAT UTRAN, the UE reads the MIB and SIB3 of the target cell UTRAN cell to acquire its CGI.

The cell, also called the target cell, whose CGI can be acquired can be intra-frequency cell, inter-frequency cell or even inter-RAT cell (e.g. UTRAN, GERAN, CDMA2000 or HRPD). There are at least few well known scenarios for which the serving cell may request the UE to report the CGI of the target cell: verification of CSG cell, establishment of Self Organising Network, SON, Automatic Neighbour Relation, ANR, and Minimisation of Drive Tests, MDT.

As described above, the UE performs inter-frequency and inter-RAT measurements in measurement gaps. The measurements may be done for various purposes: mobility, positioning, self organizing network (SON), minimization of drive tests, etc. This will be described in more detail below. Furthermore the same gap pattern is used for all types of inter-frequency and inter-RAT measurements. Therefore E-UTRAN must provide a single measurement gap pattern with constant gap duration for concurrent monitoring, i.e. cell detection and measurements, of all frequency layers and RATs.

In LTE, measurement gaps are configured by the network to enable measurements on the other LTE frequencies and/or other RATs, e.g. UTRA, GSM, CDMA2000, etc. The gap configuration is signalled to the UE over RRC protocol as part of the measurement configuration. Furthermore, the measurement gaps may need to be configured according to a certain rule, e.g. inter-frequency RSTD measurements for OTDOA require measurement gap pattern #0 and that the measurement gaps do not overlap with positioning occasions in the serving cell.

Two measurement gap patterns, both with measurement gap length of 6 ms, are defined for LTE: measurement gap #0 with repetition period 40 ms, and measurement gap #1 with repetition period 80 ms.

In general, in LTE, inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example there may also be multiple networks, which use the overlapping sets of RATs. The examples of inter-RAT measurements specified currently for LTE are UTRA FDD CPICH RSCP, UTRA FDD carrier RSSI, UTRA FDD CPICH Ec/No, GSM carrier RSSI, and CDMA2000 1×RTT Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node, e.g. E-SMLC in LTE.

Inter-band measurement is a special case of inter-frequency measurement or inter-RAT measurement. It refers to the measurement done by the UE on a target cell on the carrier frequency belonging to the frequency band which is different than that of the serving cell. Both inter-frequency and inter-RAT measurements can be intra-band or inter-band.

The motivation of inter-band measurements is that most of the UEs today support multiple bands even for the same technology. This is driven by the interest from service providers; a single service provider may own carriers in different bands and would like to make efficient use of carriers by performing load balancing on different carriers. A well known example is that of multi-band GSM terminal with 800/900/1800/1900 bands.

Furthermore a UE may also support multiple technologies e.g. GSM, UTRA FDD and E-UTRAN FDD. Since all UTRA and E-UTRA bands are common, therefore the multi-RAT UE may support same bands for all the supported RATs.

Figure 4A:
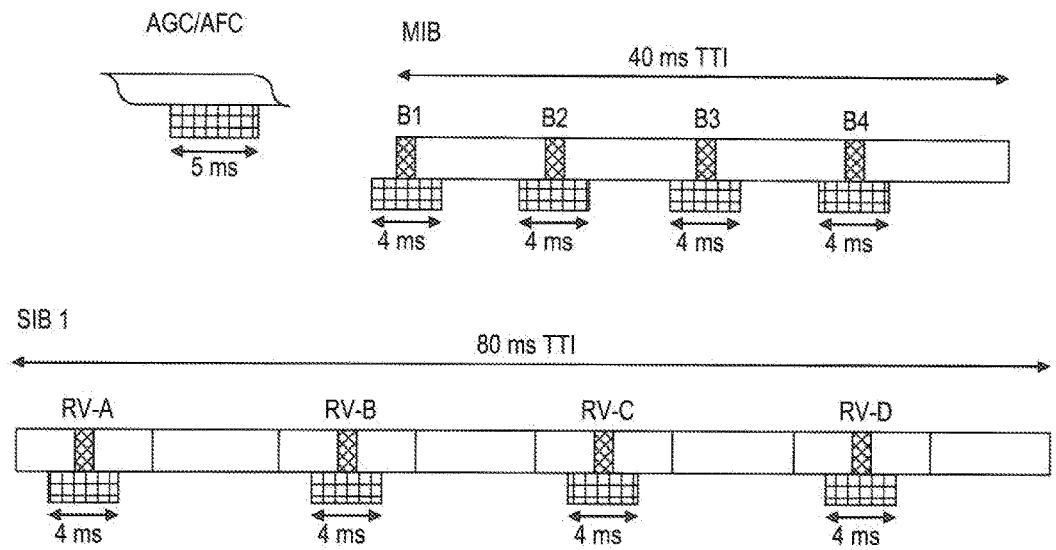
FIGS. 4a and 4b are illustrations of E-UTRAN MIB and SIB1 acquisition using autonomous gaps.
Figure 4B:
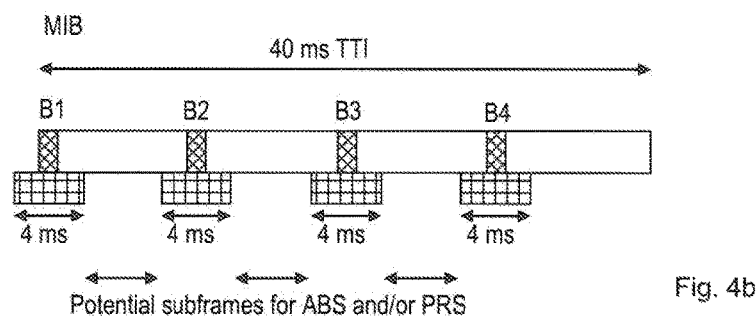

Looking at FIGS. 4a and 4b, illustrations of E-UTRAN MIB and SIB1 acquisition using autonomous gaps is exemplified. FIGS. 4a and 4b illustrate the MIB being transmitted at four different instances B1, B2, B3 and B4. The autonomous gaps created by the UE are of a certain length, in this example 4 ms. Prior to creating autonomous gaps for reading the MIB the UE creates one autonomous gap of 5 ms length for tuning or adjustment of the automatic gain controller/automatic frequency controller (AGC/AFC). The AGC adjustment is done to account for the variation in the input signal received at the RF circuitry of the UE. The AFC tuning is done to ensure that the UE RF receiver is properly tuned to the carrier frequency of the target cell, whose SI is to be acquired by the UE. The autonomous gaps are arranged in time such that they overlap the transmissions of B1-B4. FIG. 4a also illustrates that the SIB1 is transmitted at specific intervals wherein it is transmitted as 4 redundancy versions over a TTI of 80 ms. The 4 redundancy versions are denoted RV-A, RV-B, RV-C and RV-D. As for the acquisition of the MIB, the autonomous gaps are arranged in time such that they overlap the transmissions of RV-A-RV-D. FIG. 4b also illustrates that the potential subframes for Almost Blank Subframes, ABS and/or PRS are arranged in time such that they occur in-between the autonomous gaps created by the UE.

In another example, if the RAT of the cell from which the UE acquires the SI is UTRA, the MIB is transmitted on Primary Common Control Physical Channel, PCCPCH, using a 20 ms TTI every $8^{th}$ radio frame (every 80 ms). It may or may not be segmented into two consecutive transport blocks. The MIB contains scheduling information for SIB3, which carries e.g. the global cell identity. The scheduling information includes repetition period and offsets of segments in case the SIB3 is split into several segments.

Figure 5A:
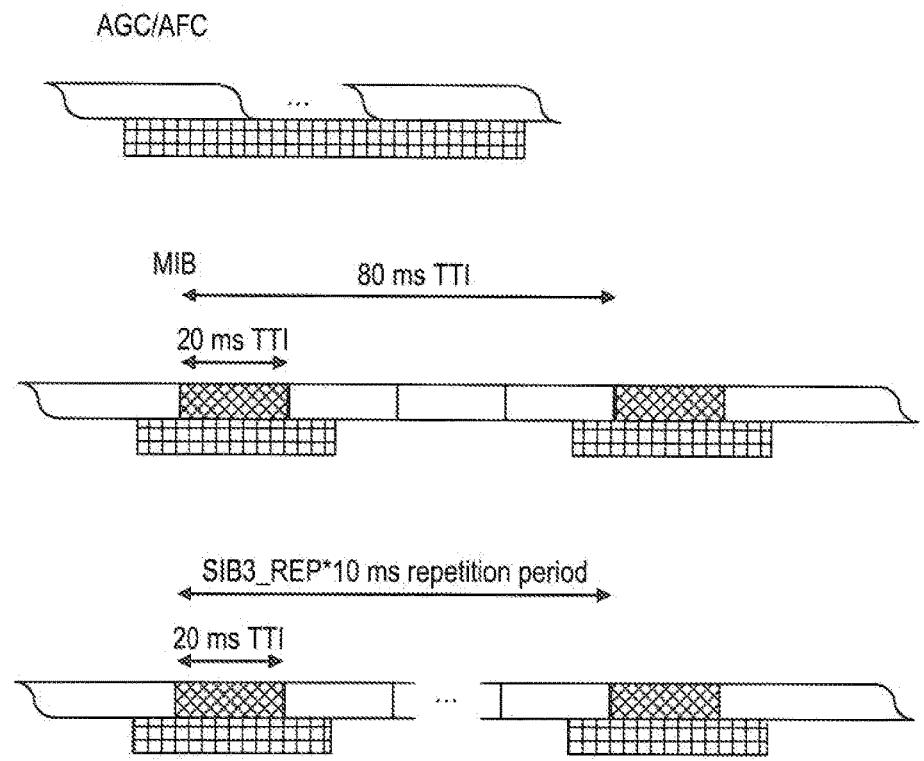
FIG. 5a is an illustration of UTRA MIB and SIB3 acquisition using autonomous gaps for non-segmented MIB and SIB3.
Figure 5B:
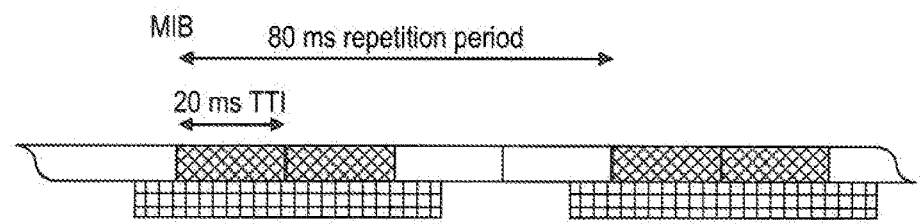
FIG. 5b is an illustration of UTRA MIB acquisition using autonomous gaps for segmented MIB.

FIG. 5a is an illustration of UTRA MIB and SIB3 acquisition using autonomous gaps for non-segmented MIB and SIB3 and FIG. 5b is an illustration of UTRA MIB acquisition using autonomous gaps for segmented MIB.

In FIGS. 5a and 5b, it can be seen that the autonomous gaps are arranged in time such that they overlap with the transmission of the MIB and SIB3 in the same manner as previously described in relation to FIGS. 4a and 4b. In FIGS. 5a and 5b, it is illustrates that the autonomous gaps have a longer duration in time than the respective segments of the MIB and SIB3.

Figure 2B:
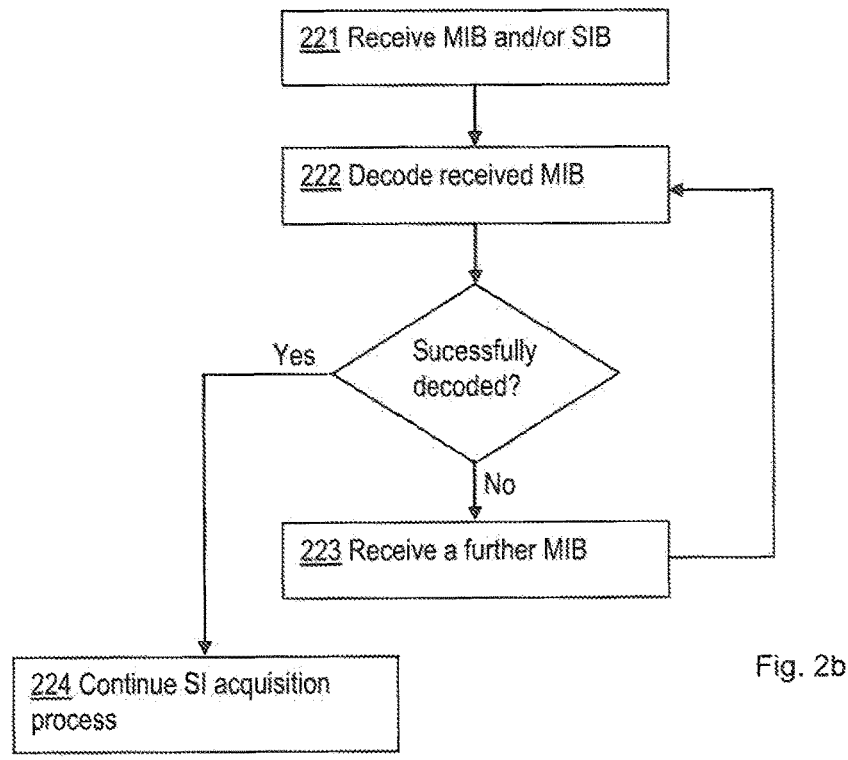
FIG. 2b is a flowchart of a method in a UE for performing measurements in a wireless communication network according to yet an embodiment.

Looking at FIG. 2b, according to an embodiment, the method in the UE comprises decoding 222 the received MIB, wherein if the received MIB is not decoded successfully, the method comprises receiving a further MIB 223 of the cell, decoding 222 the received further MIB until a last received MIB is successfully decoded.

The UE needs to decode the MIB in order to be able to extract or understand the information comprised in the MIB. Consequently, when the UE has received the MIB, the UE attempts to decode the MIB. In case the UE fails to decode the MIB, the UE will receive another MIB and attempt to decode this one. Once the UE has successfully decoded the received MIB, the UE may make use of the information comprised in the MIB and the SI acquisition process may continue 224.

Figure 8:
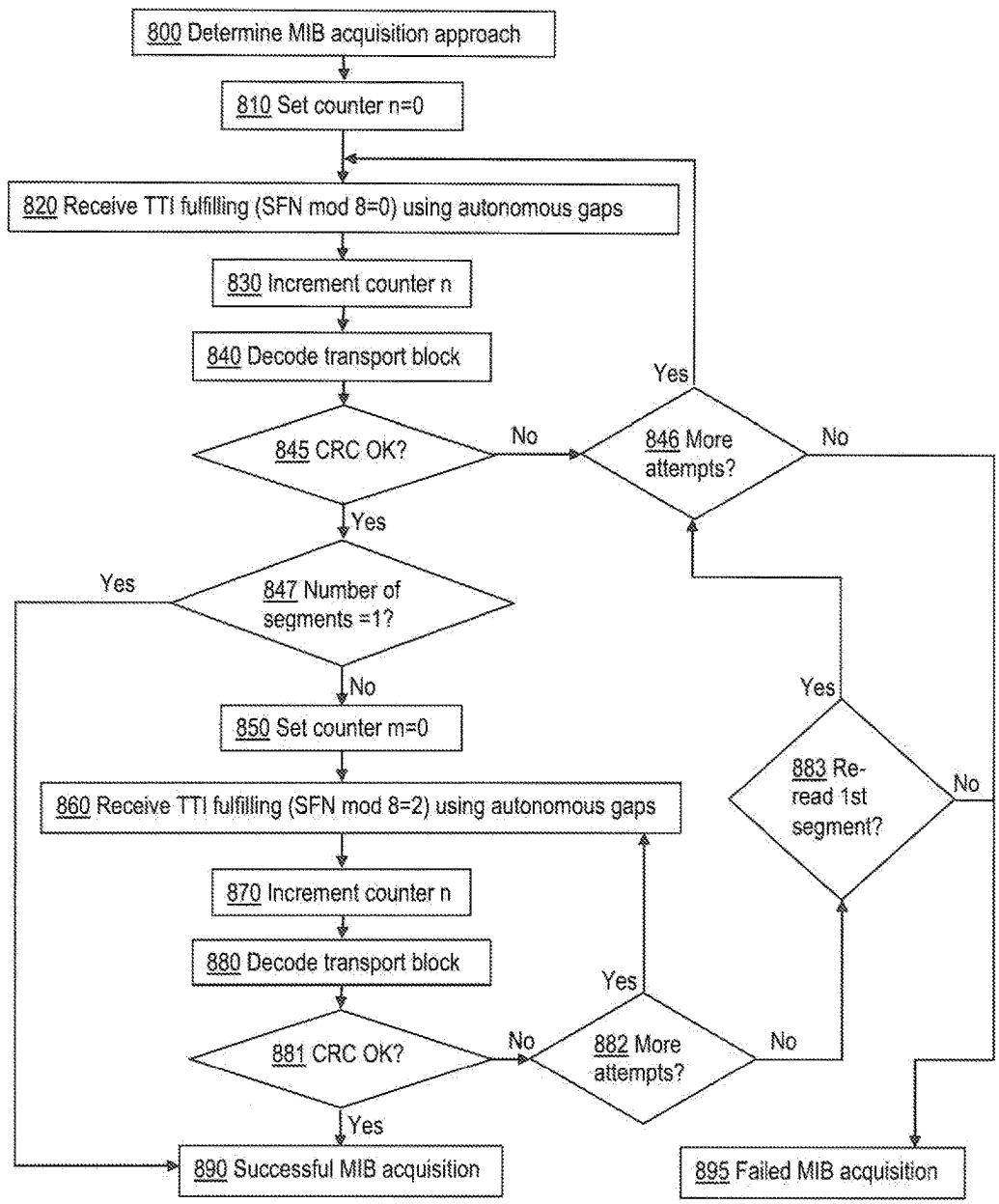
FIG. 8 is a flowchart of an example of acquisition of UTRA FDD MIB.

FIG. 8 is a flowchart of an example of acquisition of UTRA FDD MIB. In case acquisition of the first UTRA MIB instance fails, the UE may wait one or more repetition periods before it tries again. This is done to allow the UE to catch up on the measurements in restricted subframes. Whether to use this approach may depend on the rate at which the restricted subframes to be used for measurements occur. Similarly how long to wait may also depend on the aforementioned rate, where if a low rate, a longer time may be needed to catch up than if a high rate is used. As an example: low rate here may correspond to 1 out of 8 subframes for EUTRA FDD serving cell and 1 out of 10 subframes for E-UTRAN TDD serving cell.

The above UE behaviour for UTRAN MIB acquisition when SI reading and non-SI reading measurements are done in parallel by the UE may be pre-defined. The corresponding UE behaviour can also be implicitly ensured by the corresponding pre-determined requirements, which the UE should be compliant.

According to yet an embodiment, the method in the UE further comprises signalling a capability information to a network node, which capability information indicates that the UE is capable of acquiring SI of a cell during autonomous gaps, and of performing at least one non-SI measurement related to the serving and/or to one or more neighbour cells when acquiring the SI of the cell or in parallel with acquiring the SI of the cell.

In order to perform SI reading and one or more measurements (e.g. PCI acquisition, RSRP/RSRQ etc) in parallel require additional processing and memory in the UE. Therefore all UEs may not be capable of reading SI and performing one or more measurements in parallel.

According to this embodiment the UEs (e.g. high-end UEs) which can perform SI acquisition and one or more non-SI reading measurements (e.g. RSRP/RSRQ, Reference Signal Time Difference, RSTD, etc.) in parallel report, or signal, their parallel measurement capability to the radio network node (e.g. eNodeB in LTE or Radio Network Controller, RNC, in High Speed Packet Access, HSPA, etc.) and also to any other network node (e.g. positioning node such as E-SMLC in LTE, Self Organising Network, SON, node, Minimisation of Drive Test, MDT, node, Operation and Maintenance, O&M, Operations Support Systems, OSS, etc.).

The UE may also indicate the type of parallel measurements that the UE can perform while meeting the corresponding pre-defined requirements for each measurements. The type of measurements includes the type of SI reading and also the type of non-SI reading measurements. Examples of type of SI reading are: intra-frequency, inter-frequency, inter-RAT UTRAN, acquisition of CSG indicator, CSG proximity detection etc. The examples of non-SI reading measurements are RRM (e.g. RSRP/RSRQ, PCI acquisition etc), RLM, E-CID positioning measurements, OTDOA positioning measurements etc.

The node acquiring the UE parallel SI reading and non-SI reading measurement capability may signal the acquired information to another node. For example the serving radio node (e.g. serving eNodeB) may signal the UE parallel measurement capability to the target radio node (e.g. to target eNodeB over X2) for instance at the handover. In another example the serving radio node (e.g. serving eNodeB) may signal the UE parallel measurement capability to another network node (e.g. positioning node over LTE Positioning Protocol Annex, LPPa) for instance at the handover.

The UE may report its parallel SI reading and non-SI reading measurement capability proactively e.g. at the initial setup or upon receiving a request from the network e.g. from the serving eNB or from positioning node.

The receiving node (e.g. radio network node or network node) may take into account the UE capability of performing the parallel measurements (SI and non-SI reading measurements) when configuring the UE for performing the SI reading and/or non-SI reading measurements in parallel. For example if the UE (e.g. UE1) capability information indicates that UE1 can perform only intra-RAT SI reading and all intra-RAT mobility measurements (e.g. intra- or inter-frequency PCI reporting, RSRP, RSRQ, RLM etc) then the radio network node may configure only the indicated measurements in parallel.

In order to support mobility, the UE is required to identify a number of neighbour cells and report their PCI to the serving network node (e.g. serving eNodeB in E-UTRAN). The UE may also be requested to report the neighbour cell measurements such as RSRP and/or RSRQ in E-UTRAN or CPICH RSCP and/or CPICH Ec/No in UTRAN or even GERAN carrier RSSI or even pilot strength for CDMA2000/HRPD. In response to the reported UE measurement, the serving network node sends handover command to the UE.

Due to smaller cell sizes in a dense deployment scenarios, e.g. femto cells, restricted small cells like femto closed subscriber group, pico cells etc., the PC's are more frequently reused. In order to prevent HO command to a non-allowed home base station, e.g. CSG cell, the serving network node may also request the UE to decode and report the cell global identifier CGI of the target cell. This is also called as home inbound mobility. The CGI is unique in the network allowing the network to distinguish between macro BS and home BS or to uniquely identify that the reported cell belongs to CSG.

The procedure and the associated requirements for the target cell's CGI reporting are specified in E-UTRAN. One key aspect of the CGI decoding is that it is performed by the UE during the autonomous gaps, which are created by the UE itself as described above. The reason of acquiring the target cell CGI during autonomous gaps stems from the fact that the typical UE implementation is not capable to simultaneously receive the data from the serving cell and acquire the target cell's system information, which contains the CGI. Furthermore the CGI acquisition of inter-frequency or inter-RAT target cell requires the UE to even switch the carrier frequency. Hence the use of autonomous gaps is inevitable for acquiring the target cell's CGI. The autonomous gaps are created both in uplink and downlink.

Reverting to FIG. 2a, according to an embodiment, the method further comprises receiving 210 a request from the network node to acquire the SI of the cell during autonomous gaps and a request to perform the at least one non-SI measurement on serving and/or one or more neighbouring cell if the UE capability information indicates that UE is capable of acquiring the SI of a cell and performing the at least one non-SI measurement in parallel.

As described above, once the UE has signalled or reported its capabilities to the network node, the network node will know what types of measurements the UE is able to perform. Then, the network node is able to request the UE to acquire the SI of the cell accordingly. The reception of the request to acquire the SI of a cell and the request to perform the at least one non-SI measurement on serving and/or one or more neighbouring cell is illustrated in FIG. 2*a* by the dashed box 210.

According to an embodiment, acquiring 220 the SI of the cell is performed during a first extended pre-defined time period or measurement delay for SI acquisition.

According to yet an embodiment, the at least one non-SI measurement is performed 230 during a second extended pre-defined time period or measurement delay for non-SI measurement.

These embodiments apply to both E-UTRA intra-frequency (Frequency Division Duplex, FDD, and Time Division Duplex, TDD) and E-UTRA inter-frequency (FDD-FDD/TDD-TDD/FDD-TDD/TDD-FDD) SI acquisition.

The UE receives and attempts to decode MIB of the target cell. After having decoded the MIB, the UE is aware of the SFN of the target cell. Although the UE has not read information on modification period (transmitted in E-UTRAN SIB2 which is not read in this scenario), the least possible modification period (2*320=640 ms) can be calculated and the time remaining to the next potential modification period boundary can be determined based on the acquired SFN.

System information may change when crossing a modification boundary hence it is possible to assume that it is possible to soft combine redundancy versions taken at different sides. FIG. 3 is a table illustrating SIB1 acquisition with a full set of redundancy versions.

The UE may take restrictions such as restricted measurement subframes in downlink and/or uplink used for TDM eICIC, PRS subframes used for OTDOA, and other restrictions of similar kind which may include e.g. measurement gaps, into account and selects a potentially sparse E-UTRA SIB1 acquisition pattern according to FIG. 3.

When the UE decides on acquisition scheme, it may, along with the achievable performance of the measurement in question (e.g., RLM, RRM (including cell search, RSRP and RSRQ), RSTD, UE Rx-Tx, etc.), take also into account one or more of the following:
blanking rate (rate of restricted subframes),
restricted measurement pattern repetition period,
restricted measurement pattern, intra- or inter-frequency or inter-RAT,
PRS occasion repetition period (periodicity),
PRS occasion length (number of consecutive subframes),
measurement gap configuration,
discontinuous reception, DRX, cycle lengths (long (e.g. 1024 ms) and short (e.g. 40 ms), if any),
discontinuous transmission, DTX, cycle length, and/or
measurement bandwidth (e.g., system measurement bandwidth or PRS measurement bandwidth).

In case the acquisition time of a prior determined number of redundancy versions is too long to fit in the time that remains before the next modification boundary, the UE postpones the acquisition until the next modification boundary starts.

If the UE does not succeed to decode E-UTRA SIB1 within the prior determined number of attempts, the acquisition is halted and a failure is reported. Otherwise the acquisition is successful and the CGI or other information may be reported to the network.

The above UE behaviour, when it takes into account one or more of the above factors, may lead to longer delay for SI reading when the UE is also performing other measurements. The above UE behaviour can be guaranteed by the virtue of a pre-defined rule/UE behaviour. Alternatively the corresponding requirements (e.g. in terms of delay) can be defined. The requirements can implicitly ensure that the UE is compliant to the above behaviour. For example it can be pre-defined that the UE meets first set of requirements (e.g. first SI reporting delay) for reading SI when UE does not perform any other measurements otherwise the UE meets second set of requirements (e.g. second SI reporting delay) for reading SI when UE is performs other measurements in parallel with the SI reading. For example second SI reporting delay can be longer than the first SI reporting delay It may also be pre-defined the set of non-SI reading measurements which can be performed in parallel with the SI reading.

It may also be pre-defined that the UE will meet the requirements for each measurement for certain specific measurements (e.g. RRM, RLM) when non-SI reading measurements are performed in parallel with the SI reading.

An example of such a requirement is a measurement reporting delay requirement. It may be the same as for a legacy UE, which does not perform SI reading in parallel to e.g. RLM measurement, or it may still be slightly extended. In this example, the UE exploits the advantage that the autonomous gap configuration is the UE decision, so the UE knows exactly when the autonomous gaps occur and during that gap temporary adjusts measurement configuration, e.g., a signal level threshold, and restores the measurement configuration when it stops using autonomous gaps. This enables avoiding erroneous measurement reporting during the period when autonomous gaps are used. The erroneous measurements would occur due to insufficient measurement occasions left for the measurement during the SI reading when the two, at least in part, are performed in parallel since some of the measurement occasions would be "consumed" for SI reading.

In an example, instead of using sparse measurements as described in relation to FIG. 3 above, the UE analyzes the concerned restriction pattern and attempts to plan acquisition of the different RVs in such manner that as many as possible, or up to a prior determined fraction of the restricted subframes can be used for the intended purpose, e.g. RLM/RRM measurements of victim cell, OTDOA-based positioning, inter-frequency and/or inter-RAT measurements. In case of a prior determined fraction, the particular value may depend on the same factors as mentioned above in relation to FIG. 3 for selection of acquisition scheme.

The UE behaviour in this example is also ensured by the virtue of the pre-defined rule/UE behaviour. Alternatively the corresponding requirements (e.g. in terms of delay) can be defined. The requirements can also implicitly ensure that the UE is compliant to the above behaviour according to this example. This may be reflected in terms of longer SI reading delay when the UE performs other measurements in parallel with the SI reading. For example second SI reporting delay can be longer than the first SI reporting delay.

According to an embodiment, the first extended pre-defined time period or measurement delay for SI acquisition is longer than the time period or measurement delay for SI acquisition when UE does not perform any non-SI measurement.

This means that when first extended pre-defined period is used then the total number of autonomous gaps required to acquire the SI of a cell are spread over a longer time period compared to the case when the UE does not perform any non-SI measurement. The advantage of extending the period is that at least one non-SI measurement can also be performed in parallel with the SI acquisition i.e. during the first pre-defined period. For example by acquiring the SI over the first extended pre-defined time period the UE can perform a critical measurement such as radio link monitoring (RLM). This will ensure that the serving cell quality is monitored while UE acquires the SI. Without the use of the first extended pre-defined time period the UE will not be able to perform RLM. This may lead to radio link failure and thus the connection can be lost. This may even prevent the UE to continue acquiring the SI, which requires like for any other measurement that the UE retains connection with the serving cell.

According to yet an embodiment, the second extended pre-defined time period or measurement delay for non-SI measurement is longer than the time period or measurement delay for non-SI measurement when UE does not acquire the SI.

The consequence of this is that when first extended pre-defined period is used then the non-SI measurement is performed over a longer time period compared to the case when does not acquire the SI in parallel with non-SI measurement. The advantage of extending the period of non-SI measurement is that at least one non-SI measurement can be performed by the UE in parallel with the SI acquisition i.e. during the first pre-defined period. For example by performing the non-SI measurement over the first extended pre-defined time period the UE can perform continue to perform the critical measurements such as radio link monitoring (RLM) or mobility measurements or even positioning measurements. The positioning measurements may be needed for critical services such as for emergency calls. The RLM measurement ensures that at least the serving cell quality is monitored while UE acquires the SI. Without the use of the first extended pre-defined time period the UE will not be able to perform RLM. This may lead to radio link failure and thus the connection can be lost. This may even prevent the UE to continue acquiring the SI, which requires like for any other measurement that the UE retains connection with the serving cell.

When the UE decides on acquisition scheme e.g. according to any of the embodiments described above, the UE may take into account the purpose of the SI acquisition measurement request from the network. In case of preparation for a potential handover, the UE may allow some more impact on the activities intended to be carried out in the restricted subframes in order to acquire SIB1 in a timely manner.

If on the other hand the purpose can be deduced to be for ANR, the UE may pay more attention to the potential loss of measurement or positioning performance, and hence allow the SI acquisition to take longer time. Other examples of higher and lower priority purposes are positioning measurements for emergency and MDT measurements, respectively.

This means the SI requirements, e.g. SI reporting delay, may be dependent on the purpose (i.e. handover, SON, MDT, positioning, etc.) when the UE reads SI in parallel with the normal measurements, e.g. RLM, RRM, cell search, positioning measurements etc. Such a rule can be pre-defined to ensure that the UE is compliant to the intended behaviour.

According to still an embodiment, wherein the cell belongs to Evolved Universal Terrestrial Radio Access Network, E-UTRAN, and the relevant SIB is SIB1, the acquiring of the SI information comprising the steps of decoding a System Frame Number, SFN, of the E-UTRAN cell from the received MIB, and identifying one or more of cell global identity (CGI), closed subscriber group (CSG) indicator or CSG proximity detection of the E-UTRAN cell from the received SIB1.

When the UE has received the MIB, the UE decodes the MIB. The MIB comprises among other information, the SFN. Based on the SFN, the least possible modification period and the time remaining to the next potential modification period may be determined as described above. The SIB1 is transmitted to specify the timing of remaining System Information, along with aspects of the cell identity such as e.g. Public Land Mobile Network (PLMN) identity, cell global identity (CGI), closed subscriber group (CSG) indicator or CSG proximity detection of the target E-UTRAN cell.

According to still an embodiment, wherein the cell belongs to UTRAN and the relevant SIB is SIB3, the acquiring of the SI information comprises the steps of: decoding the SFN of the UTRAN cell from the received MIB, and identifying one or more of CGI, CSG indicator or CSG proximity detection of the target UTRAN cell from the received SIB3.

When the UE has received the MIB, the UE decodes the MIB. The MIB comprises among other information, the SFN. Using the SFN, the UE is able to receive the SIB3. From the received SIB3, the UR identifies one or more of CGI, CSG indicator or CSG proximity detection of the target UTRAN cell.

Figure 7:
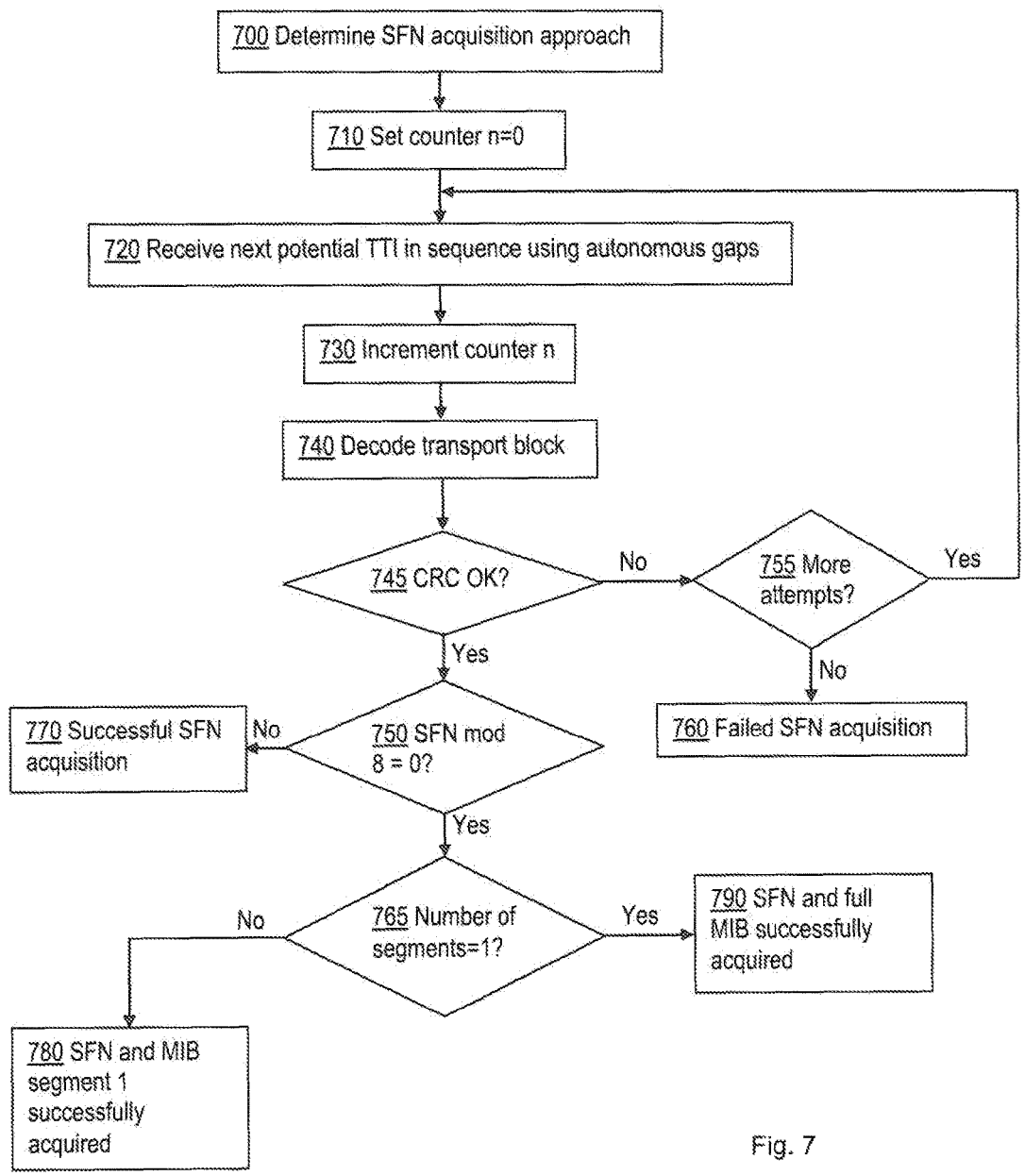
FIG. 7 is a flowchart of an example of acquisition of UTRA FDD SFN.

This embodiment is described for the UTRAN FDD configuration, but can easily be extended to the UTRAN TDD configuration. There are minor differences in how the MIB is transmitted, but the same principle applies. An example of this embodiment is illustrated in FIG. 7, which is a flowchart of an example of acquisition of UTRA FDD SFN.

When acquiring the SFN, the UE receives 20 ms (2 radio frames) of PCCPCH, which has a fixed transport format and fixed TTI length of 20 ms, and attempts to decode the transport block 740. In general a transport block (TB) contains data or control information, which is interleaved over a TTI. The TB is mapped over a transport channel for transmission to the UE. In this case the TB contains broadcast information, which is interleaved over 20 ms. If the CRC is OK, the UE can extract the Prime SFN number which, when multiplied by 2, gives the SFN.

If, on the other hand, the CRC is not OK it may mean that the UE was misaligned by 10 ms when receiving PCCPCH, but it may also mean that the radio propagation conditions and/or the geometry are unfavourable and the UE will need several attempts to decode a transport block from the BCH. Since the UE does not know, before trying to decode another 2 radio frames of PCCPCH taken at some instant corresponding to a multiple of 20 ms after the previous attempt, the UE may try to decode 2 radio frames taken at an instant 10 ms plus a multiple of 20 ms after the previous attempt.

In order to use the radio more efficiently, the UE may for instance acquire 30 ms of PCCPCH, and then try to decode the initial 20 ms, and if CRC does not check, try to decode the latter 20 ms, by which 10 ms are reused.

In case an attempt to decode the SFN fails (for both alignment alternatives), the UE may wait a prior determined number of radio frames before it tries again, in order to allow the UE to catch up on the measurements in the restricted subframes. Which approach to use and when to try the next time when a decoding attempt fails may depend on the rate at which restricted subframes to be used for measurements occurs. In case of low rate, it may be attractive to receive two significantly separated blocks of 20 ms instead of receiving one block of 30 ms, and/or to have a significant temporal separation (say at least 160 ms) between two attempts to decode SFN. If on the other hand the rate is high one may for instance receive one block of 30 ms, and/or retry decoding sooner than in the example above, e.g. already after say 80 ms. Low rate may for instance mean 1 out of 8 subframes for EUTRA FDD and 1 out of 10 for EUTRA TDD.

The above UE behaviour for UTRAN SFN acquisition when SI reading and non-SI reading measurements are done in parallel by the UE may be pre-defined in a standard. The corresponding UE behaviour can also be implicitly ensured by the corresponding pre-determined requirements, which the UE should be compliant.

According to an embodiment, the at least one non-SI measurement belongs to any of the following measurement type or category:
 radio link monitoring (RLM),
 identification of PCI,
 RRM measurements,
 Mobility measurements,
 channel quality indicator, CSI, measurement,
 positioning measurements,
 self organizing network (SON) measurements, or
  minimization of drive tests (MDT) measurements.

According to an embodiment, the non-SI measurement is performed in a measurement pattern.

According to yet an embodiment, the measurement pattern is one or more of: restricted measurement pattern comprising restricted subframes used for one or more restricted measurements for enabling Enhanced Inter-cell Interference Coordination (eICIC); and positioning reference signal (PRS) measurement pattern comprising Positioning Reference Signal, PRS, subframes for positioning measurement, Reference Signal Time Difference, RSTD.

To enable restricted measurements for RRM, RLM, CSI as well as for demodulation, the UE may receive via Radio Resource Control, RRC, UE-specific signalling, the following set of patterns: Pattern 1: a single RRM/RLM measurement resource restriction for the serving cell; Pattern 2: one RRM measurement resource restriction for neighbour cells (up to 32 cells) per frequency; and Pattern 3: resource restriction for CSI measurement of the serving cell with 2 subframe subsets configured per UE.

A pattern is a bit string indicating restricted and unrestricted subframes characterized by a length and periodicity, which are different for FDD and TDD, 40 subframes for FDD and 20, 60 or 70 subframes for TDD.

Restricted measurement subframes are configured to allow the UE to perform measurements in subframes with improved interference conditions, which may be implemented by configuring Almost Blank Subframe, ABS, patterns at eNodeBs.

The current 3GPP standard in Release 10 defines only intra-frequency restricted measurement patterns, although similar patterns may also be defined for UE inter-frequency measurements e.g. inter-frequency cell search, RSRP, RSRQ, positioning measurements etc. This means the measurement pattern may be configured for measuring inter-frequency cells on each inter-frequency carrier. Similarly the measurement patterns may also be used for performing inter-RAT E-UTRAN measurements. In this case the cell on the serving RAT, e.g. UTRAN, GERAN, CDMA2000, HRPD etc., will configure the pattern enabling UE to perform inter-RAT E-UTRAN measurements, e.g. inter-RAT E-UTRAN cell search, RSRP, RSRQ, positioning measurements etc.

An ABS pattern indicates subframes when the eNodeB restricts its transmissions, e.g. does not schedule or transmits at a lower power. The subframes with restricted transmissions are referred to as ABS subframes. The eNodeBs may suppress data transmissions in ABS subframes but the ABS subframes cannot be fully blank, at least some of the control channels and physical signals are still transmitted. Examples of control channels that are transmitted in ABS subframes even when no data is transmitted are Physical Broadcast Channel, PBCH, and PHICH. Examples of physical signals that have to be transmitted, disregard on whether the subframes are ABS or not, are cell-specific reference signals, CRS and synchronization signals, Primary Synchronisation signal, PSS, and Secondary Synchronisation signal, SSS. Positioning reference signals, PRS, may also be transmitted in ABS subframes.

If an MBSFN subframe coincides with an ABS, the subframe is also considered as ABS. CRS are not transmitted in MBSFN subframes, except for the first symbol, which allows for avoiding CRS interference from an aggressor cell to the data region of a measured cell. ABS patterns may be exchanged between eNodeBs, e.g., via X2, but these patterns are not signalled to the UE.

The UL ABS patterns or UL low interference sub-frames or even low inter-frequency time-frequency occasions may be introduced in the uplink in the aggressor cell e.g. macro cell, to avoid or minimize the uplink interference from the macro UE, i.e. connected to the macro cell, towards the victim base cell, e.g. victim pico base station. This means during the UL ABS pattern the aggressor cell, e.g. macro cell, restricts UL transmissions of the macro UE, e.g. does not schedule or transmits at a lower power. During the corresponding sub-frames in the victim cell the UEs may be scheduled.

The restricted UL patterns in the victim cell will affect the measurements which involve uplink transmissions e.g. RACH transmissions, UE Rx-Tx time difference measurements, timing advanced, eNodeB Rx-Tx time difference measurements, Timing Advance, any measurement on SRS, etc.

The self organizing network, SON, function in E-UTRAN allows the operators to automatically plan and tune the network parameters and network nodes. The conventional method is based on manual tuning, which consumes enormous amount of time, resources and requires considerable involvement of work force.

Due to network complexity, large number of system parameters, IRAT technologies etc., it is very attractive to have reliable schemes to perform the test of self organization in the network whenever necessary.

An operator can also add or delete a cell or an entire base station (with multiple cells). Especially new cells are added more frequently during an early phase of network deployment. In the later stages an operator can still upgrade the network by adding more carriers or more base stations on the same carrier. It can also add cells related to another technology. This is called as the automatic neighbour cell relation, ANR, establishment and is part of the SON. In order to ensure correct establishment of the neighbour cell relation, the serving cell requests the UE to report the CGI of the new target cell, whose PCI is identified and reported to the said serving cell. The CGI acquisition requires the UE to read the target cell's system information and is thus carried out by the UE during the autonomous gaps. As in case of home inbound mobility, the CGI acquisition for ANR purpose, also lead to interruption of the data from the serving cell.

The minimization of drive test, MDT, feature has been introduced in LTE and HSPA release 10. The MDT feature provides means for reducing the effort for operators when gathering information for the purpose of network planning and optimization. The MDT feature requires that the UEs log or obtain various types of measurements, events and coverage related information. The logged or collected measurements or relevant information are then sent to the network. This is in contrast to the traditional approach where the operator has to collect similar information by means of the so called drive tests and manual logging.

The UE can collect the measurements during connected as well as in low activity states e.g. idle state in UTRA/E-UTRA, cell PCH states in UTRA etc. Some examples of potential MDT UE measurements are: mobility measurements e.g. RSRP, RSRQ etc., random access failure, paging channel failure (PCCH Decode Error), broadcast channel failure and radio link failure report.

The UE may also be configured to report the CGI of the target cells along with other measurements (e.g. RSRP, RSRQ etc). In connected mode the existing procedures are used to acquire the CGI of the target cells for the purpose of the MDT. In idle mode the UE can be configured to log the cell measurements along with the CGI and report the logged measurements to the network at suitable occasion, e.g. when UE goes to connected mode. One key aspect that distinguishes the normal CGI reporting is that in case of MDT, the acquired CGI of the target cells are acquired by the MDT functionality e.g. MDT node which can be a logical or physical node. The MDT node may use the acquired CGI for network planning and optimizing of the network. The CGI for MDT purpose is also acquired during the autonomous gaps as in case of CSG inbound mobility or SON ANR.

According to an embodiment, the RRM measurement comprises a signal level measurement further comprising any one or more of:
  RSRP,
  RSRQ,
  Common Pilot Indicator Channel, CPICH, Received Signal Code Power, RSCP,
  CPICH Ec (RSCP)/No (RSSI—Received Signal Strength Indicator),
  UTRAN carrier RSSI
  Global System for Mobile Communications, GSM, carrier RSSI,
  High Rate Packet Data, HRPD, Pilot Strength, and
    Code Division Multiple Access 2000, CDMA2000, 1×RTT Pilot Strength.

Depending on the RRM measurement being e.g. inter-RAT or intra-RAT different signal level measurements are available to be used. GSM, WCDMA and LTE all employ different measurements for signal level; hence the UE must employ the appropriate RRM measurement for the target cell, i.e. the cell for which the RRM measurements are performed.

In order to increase the highest possible data rates in LTE, a scheme called carrier aggregation has been introduced. Shortly, to achieve the high data rates, it is necessary to increase the transmission bandwidths over those that can be supported by a single carrier or channel. Employing the carrier aggregation, it is possible to utilise more than one carrier and in this way increase the overall transmission bandwidth. In carrier aggregation, there is a Primary Serving Cell, PCell and at least one Secondary Serving Cell, SCell. If this scheme is employed, the UE applies the system information acquisition and change monitoring procedures for the PCell only. For SCells, E-UTRAN provides, via dedicated signalling, all system information relevant for operation in RRC_CONNECTED when adding the SCell. Hence the UE creates autonomous gaps for reading the neighbour cell CGI in the downlink and uplink on the PCell, according to the current standard. However, the embodiments disclosed herein cover in general also a case when the UE uses autonomous gaps for reading any SI, which may also be on SCell.

Figure 6:
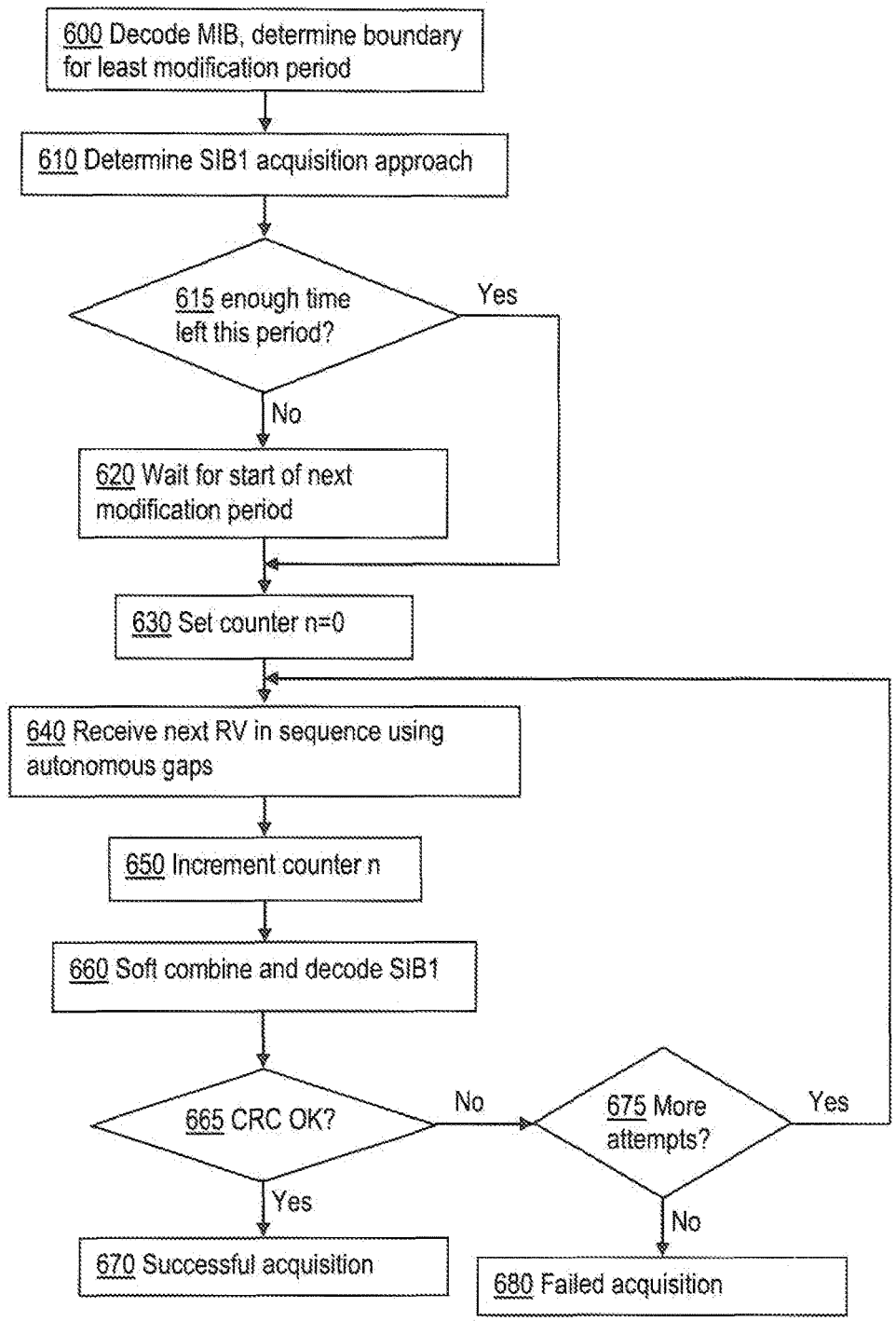
FIG. 6 is a flowchart of an example of acquisition of E-UTRA MIB and SIB1.

FIG. 6 is a flowchart of an example of acquisition of E-UTRA MIB and SIB1. When the UE decides on how many SIB1 RVs or instances thereof to attempt to decode before reporting a failure, it may take into account how many MIB blocks from the same 40 ms TTI were needed in order to decode MIB. For instance, in case a single block was needed, it is likely that fewer than 4 RVs are enough for successful decoding of SIB1.

The UE may additionally take this number into account when deciding whether acquisition can start immediately or whether it is to be postponed to the next modification period.

The above UE behaviour for E-UTRAN intra-RAT SI acquisition, when SI reading and non-SI reading measurements are done in parallel by the UE, can be pre-defined. The corresponding UE behaviour can also be implicitly ensured by the corresponding pre-determined requirements, which the UE should be compliant.

Looking at FIG. 6, the UE decodes 600 a received MIB and determines a boundary for least modification period. Thereafter, the UE determines which approach to employ for acquiring the SIB1. If there is sufficient time left in the current period, the UE sets 630 a counter n to 0. Otherwise, the UE waits 620 for the start of the next modification period. Once the counter n is set to 0, the UE receives 640 a first RV using autonomous gaps and the UE increments the counter n. Since this is the first RV, only decoding of SIB1 is performed at step 660 in FIG. 6. However, the UE checks 665 if a cyclic redundancy check, CRC, is ok, indicating that the acquisition is successful. So far, the UE has obtained only one RV and this may suffice. In case a further RV is required, due to the CRC not being ok, the UE checks 675 if more attempts are to be performed. In this step, the UE may take into account how many MIB blocks from the same 40 ms TTI were needed in order to decode MIB. Assuming that one more RV is to be received, the UE receives 640 a next RV in sequence using autonomous gaps, increments the counter n and soft combines 660 the first received RV with the next RV in sequence and decodes SIB1. Thereafter, the UE checks in the CRC is ok, indicating successful acquisition; or if not, if more attempts are to be performed. In case no more attempts are to be performed, the UE determines the acquisition of SIB1 to have failed 680.

Figure 9:
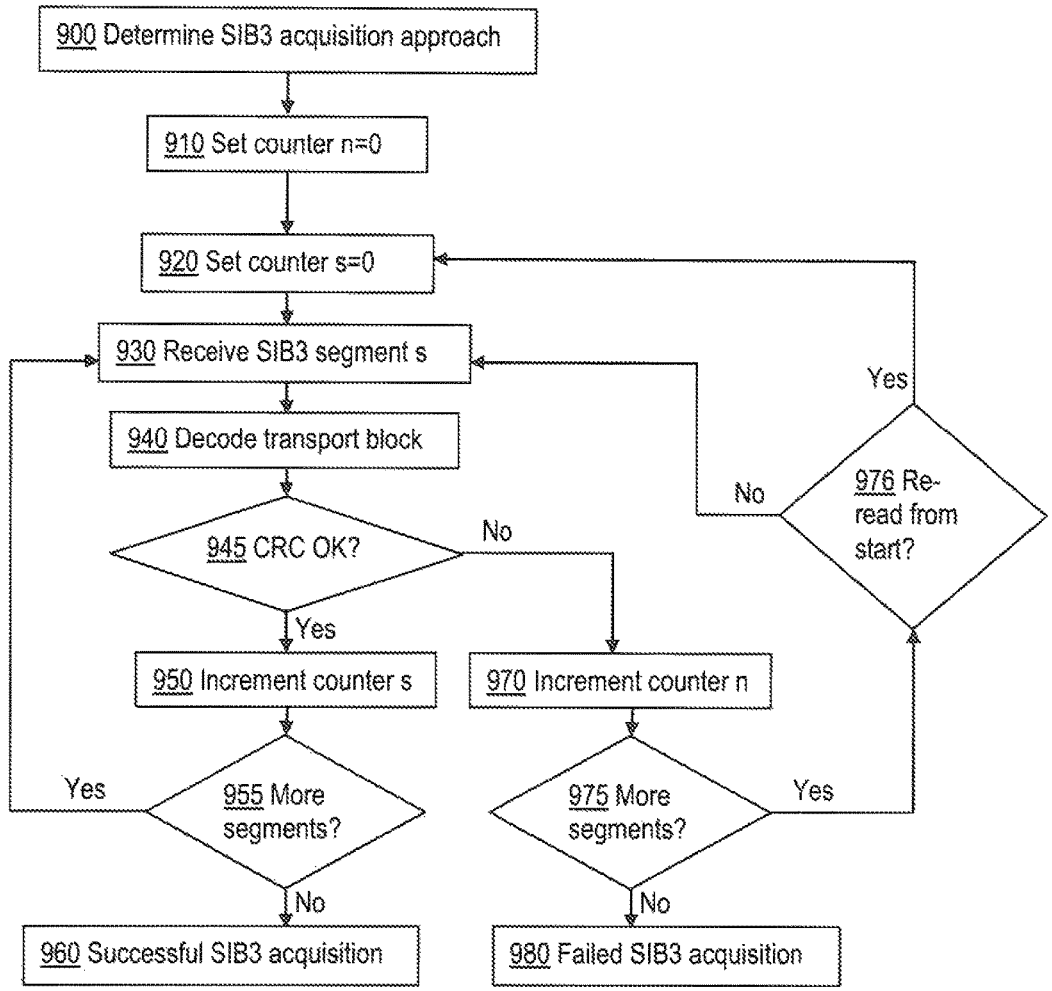
FIG. 9 is a flowchart of an example of acquisition of UTRA SIB3.

FIG. 9 is a flowchart of an example of acquisition of UTRA SIB3.

In case decoding of a segment within a repetition period fails, the UE may wait one or more repetition periods before trying to decode the SIB3 again—this in order to allow measurements in restricted subframes to catch up or to avoid clash with PRS occasion(s). When deciding on strategy, the UE may for instance take into account the repetition period and potential segmentation of the SIB3, as well as the rate at which the restricted subframes to be used for measurements occur. This is illustrated in FIG. 9 by checking in step 945 if the CRC of the decoded SIB3 segment is ok; and if it is not a counter n is incremented 975 and in step 976 it is checked if the same segment shall be received again in step 930, or if the whole acquisition of SIB3 process is to start over in step 920.

The above UE behaviour for UTRAN SIB3 acquisition when SI reading and non-SI reading measurements are done in parallel by the UE can be pre-defined. The corresponding UE behaviour can also be implicitly ensured by the corresponding pre-determined requirements, which the UE should be compliant.

In an example, in case of clashes between SI reception and e.g. PRS subframes for OTDOA which at most occur every 160, the UE may either skip reception from target cell in order not to degrade positioning performance, or it may schedule/postpone the reception in such manner that the SI acquisition and/or the SFN acquisition does not collide with the PRS occasion. The EUTRA MIB TTI is 40 ms and SIB1 TTI is 80 ms, hence it is possible to avoid clashes with PRS. The UTRA MIB may span over 20 to 40 ms with a repetition period of 80 ms, hence it should be possible to avoid clashes with PRS when reading MIB.

According to an embodiment the method further comprises reporting 240 the acquired SI to the serving cell, see FIG. 2a.

Once the UE has acquired the SI, the UE reports the acquired SI to the serving radio base station, which means the radio base station to which the UE is connected.

Embodiments herein also relate to methods radio nodes, e.g. eNodeBs. The eNodeBs may cooperate in such manner that e.g. ABS pattern in one base station does not collide with too large extent with E-UTRA MIB in a neighbour cell. Moreover the NBs may take into account that if UTRA SIB3 is spread out over several SI messages, the UE will have to tune in to that carrier a longer time than if it is transmitted in a single SI message.

Embodiments of a method in a serving network node for configuring measurements performed by a UE will now be described with reference to FIG. 10 which is a flowchart of a method in a serving network node for configuring measurements performed by a UE according to an embodiment.

Figure 10:
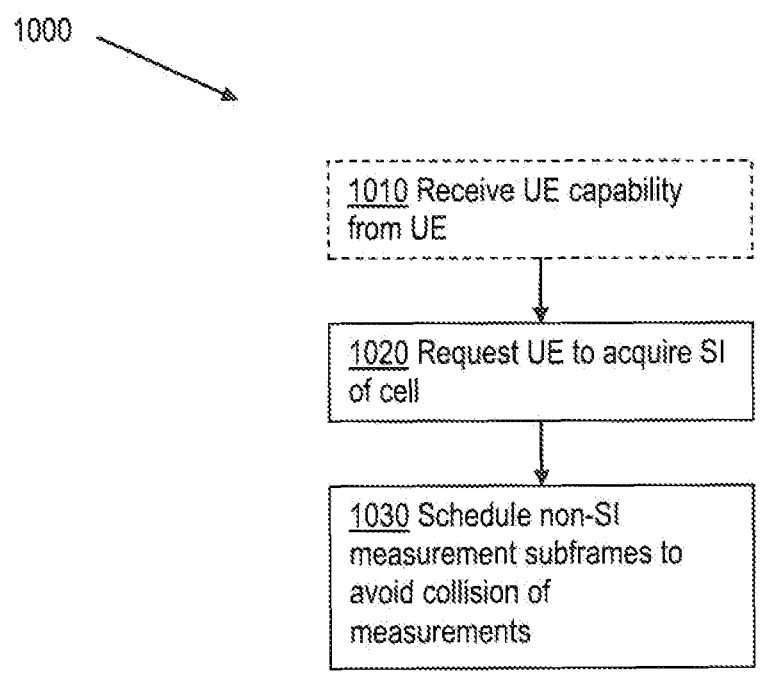
FIG. 10 is a flowchart of a method in a serving network node for configuring measurements performed by a UE according to an embodiment.

FIG. 10 illustrates the method comprising requesting 1020 the UE to acquire system information, SI, of a cell during autonomous gaps created by the UE. The method further comprises scheduling 1030 non-SI measurement subframes in order to avoid collision between the non-SI measurement subframes and the UE created autonomous gaps.

The UE is requested by the serving network node to acquire system information, SI, of a cell during autonomous gaps created by the UE, the cell being a neighbouring cell, also called a target cell. The UE will still perform at least one non-SI measurement related to a serving and/or to one or more neighbour cells during a time period comprising the autonomous gaps. In order to assist the UE to perform the non-SI measurements, the network node schedules non-SI measurement subframes in order to avoid collision between the non-SI measurement subframes and the UE created autonomous gaps.

This has the advantage that the performance of DL measurements may be improved when autonomous gaps are used by the UE and restricted measurements are configured. Also performance of UL measurements may be improved when autonomous gaps are used by the UE and restricted measurements are configured. Further, the radio node configuration facilitating UE measurements when the UE uses autonomous gaps and restricted measurements are configured may be improved.

According to an embodiment, the method further comprises, before requesting the UE to acquire the SI of the cell, receiving 1010, from the UE, a capability information of the UE, which capability information indicates that the UE is capable of acquiring the SI of a cell during autonomous gaps created by the UE, and performing at least one non-SI measurement related to the serving and/or to one or more neighbour cells when acquiring the SI of the cell or in parallel with acquiring SI of the cell. The method further comprises requesting 1020 the UE to acquire the SI of the cell during autonomous gaps created by the UE and to perform at least one non-SI measurement on serving and/or one or more neighbouring cell if the UE capability indicates that it is capable of performing the said SI and non-SI measurements in parallel.

According to yet an embodiment, wherein the network node of the cell from which the UE is requested to acquire the SI is an E-UTRAN network node, the method further comprising aligning the network node with the E-UTRAN network node by a pre-determined number of subframes before requesting the UE to acquire the SI of the cell during autonomous gaps created by the UE and requesting the UE to perform at least one non-SI measurement on serving and/or one or more neighbouring cell if the UE capability indicates that it is capable of performing the SI and non-SI measurements in parallel.

The serving/source eNB schedules the ABS, and/or restricted measurement subframes for UE measurements, and/or PRS, and/or measurement gaps in such manner that the impact thereon when a UE carries out SI acquisition using autonomous gaps is negligible. This means that the serving/source eNB avoids configuring e.g. ABS and/or restricted measurement subframe in subframes that are likely to be used for MIB acquisition by a UE. This is exemplified in FIG. 4b.

This may also mean that e.g. a target eNodeB or HeNodeB shall be aligned with the serving/source eNB by some prior determined number of subframes, according to some prior determined scheme, according to information exchanged through signalling between the base stations, or information gathered via analysis of measurements reported the base station by UEs. In case the SI acquisition and the ABS clashes severely, the eNodeB may see this as a larger degradation in reported measurement values than otherwise would result, and can test another ABS pattern.

What has been described about MIB above can also be applied to the SIB1. Moreover it is possible to define patterns that distribute the impact between MIB and SIB1 reception since every second radio frame, both MIB and SIB1 are transmitted.

Figure 11:
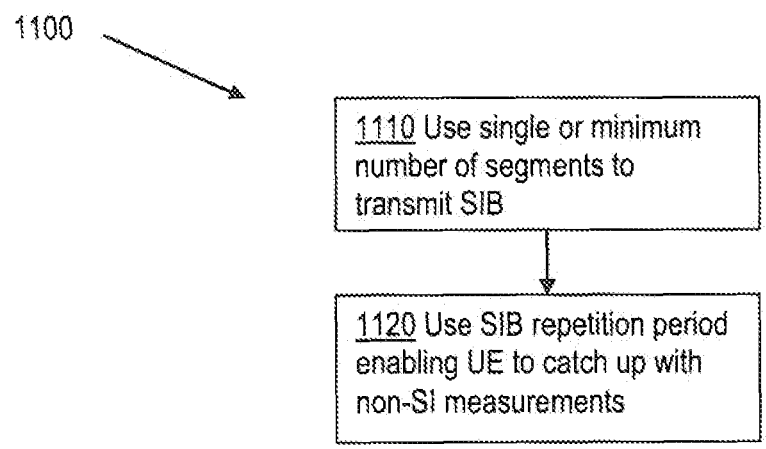
FIG. 11 is a flowchart of a method in a target network node for enabling a UE to acquire SI according to an embodiment.

Embodiments of a method in a target network node for enabling a User Equipment, UE to acquire SI will now be described with reference to FIG. 11 which is a flowchart of a method in a target network node for enabling a UE to acquire SI according to an embodiment.

The target network node is associated to a cell from which the UE is requested to acquire the SI and may be any one of: an UTRAN network node, E-UTRAN network node, GSM network node, CDMA2000 network node or multi-standard radio base station.

The method comprises receiving information that the UE is attempting to acquire a SIB and determining to minimise the impact of SIB scheduling on SI acquisition for the UE by: using 1110 a single or a minimum number of segments to transmit the SIB, wherein if more than one segment is used to transmit the SIB, then the method comprises transmitting the segments at System Frame Number, SFN, offsets that enable the UE to catch up non-SI measurements in between; and/or using 1120 a SIB repetition period that enables the UE to catch up non-SI measurements in between reception of the SIB or segments thereof.

The target NB/HNB considers impact of SIB3 scheduling on UEs engaged in SI acquisition using autonomous gaps while also supporting e.g. TDM eICIC, and sets repetition period, segmentation and concatenation accordingly. The aim is to reduce the time needed to acquire a SIB3 block hence the NB/HNB, i.e. the target network node, strives to use a single or a minimum number of segments to transmit SIB3. This might not always be possible, and in case several segments must be used, the NB/HNB transmits those at SFN offsets that allow the UE to catch up measurements in between. Alternatively, or in addition, the NB/HNB uses a SIB repetition period that allows a UE to catch up on measurements in between reception of SIB3 or segments thereof.

This method also has the advantage that the performance of DL measurements may be improved when autonomous gaps are used by the UE and restricted measurements are configured. Also performance of UL measurements may be improved when autonomous gaps are used by the UE and restricted measurements are configured. Further, the radio node configuration facilitating UE measurements when the UE uses autonomous gaps and restricted measurements are configured may be improved.

Embodiments herein also relate to a UE adapted to perform measurements in a wireless communication network, a serving network node adapted to configure measurements performed by a UE and a target network node adapted to enable a U, to acquire SI.

These embodiments have the same objects and advantages as the respective method therein as described above. Consequently, the UE, the serving network node and the target network node will be described in brief in order to avoid unnecessary repetition.

Figure 12:
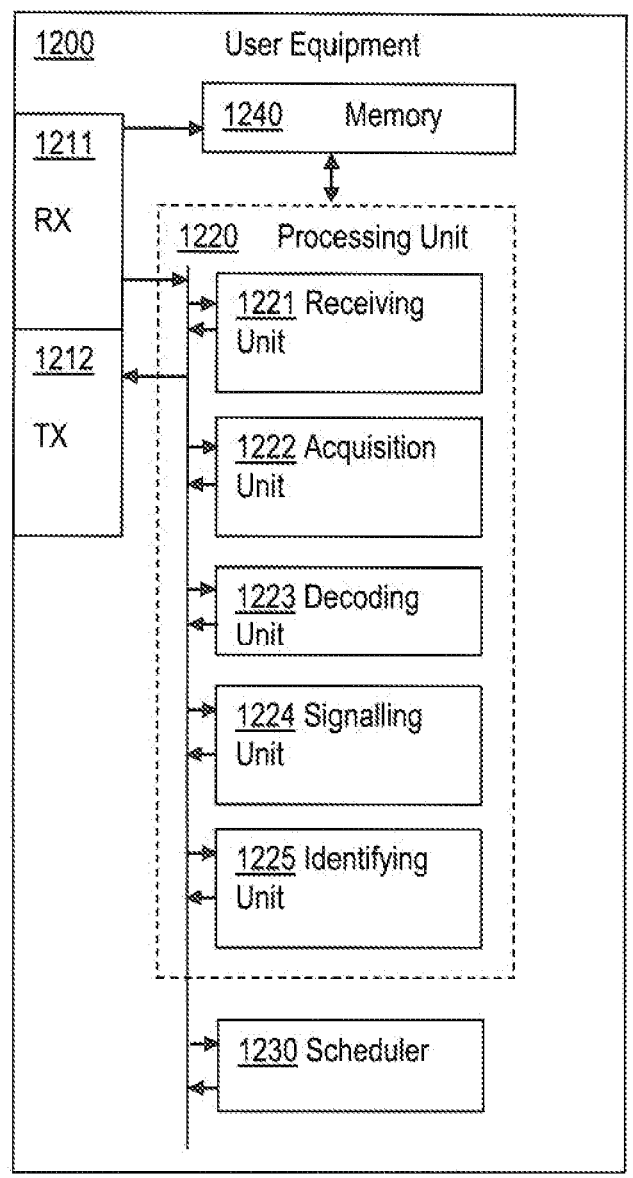
FIG. 12 is a block diagram of a UE adapted to perform measurements in a wireless communication network according to an embodiment.

FIG. 12 is a block diagram of a UE adapted to perform measurements in a wireless communication network according to an embodiment.

FIG. 12 illustrates the UE 1200 comprising an acquisition unit 1222 adapted to acquire system information, SI, of a cell during autonomous gaps created by the UE, and to perform at least one non-SI measurement related to a serving and/or to one or more neighbour cells during a time period comprising the autonomous gaps.

The UE 1200 is illustrated comprising a receiving arrangement 1211 and a transmitting arrangement 1212. These arrangements are simplified illustrations comprising e.g. an antenna arrangement and some processing capacity. The receiving and transmitting arrangements 1211 and 1212 are illustrated being able to communicate with a memory 1240 and a processing unit 1220. The processing unit 1220 is further being illustrated by a dashed box which in turn comprises a plurality of units adapted for certain purposes such as e.g. decoding and identifying. The UE 1200 is further illustrated comprising a scheduler 1230. UE illustrated in FIG. 12 is to be considered an exemplifying illustration.

According to an embodiment, the acquisition unit 1222 further is adapted to acquire the SI by receiving at least one of: a Master Information Block, MIB, and a System Information Block, SIB, of the cell.

According to yet an embodiment, the UE 1200 further comprises a decoding unit 1223 adapted to decode the received MIB, wherein if the received MIB is not decoded successfully, the acquisition unit 1222 further is adapted to receive a further MIB of the cell, wherein the decoding unit 1223 further is adapted to decode the received further MIB until a last received MIB is successfully decoded.

According to still an embodiment, the UE 1200 further comprises a signalling unit 1224 adapted to signal a capability information to a network node, which capability information indicates that the UE is capable of acquiring SI of a cell during autonomous gaps, and performing at least one non-SI measurement related to the serving and/or to one or more neighbour cells when acquiring the SI of the cell or in parallel with acquiring the SI of the cell.

According to another embodiment, the UE 1200 further comprises a receiving unit 1221 adapted to receive a request from the network node for the UE to acquire the SI of the cell during autonomous gaps. The receiving unit 1221 is also adapted to receive a request for the UE to perform at the least one non-SI measurement on serving and/or one or more neighbouring cell if the UE capability information indicates that UE is capable of acquiring the SI of a cell and performing the at least one non-SI measurement in parallel.

According to an embodiment, the acquisition unit 1222 further is adapted to acquire the SI of the cell during a first extended pre-defined time period or measurement delay for SI acquisition.

According to still an embodiment, the acquisition unit 1222 further is adapted to perform the at least one non-SI measurement during a second extended pre-defined time period or measurement delay for non-SI measurement.

According to still an embodiment, the first extended pre-defined time period or measurement delay for SI acquisition is longer than the time period or measurement delay for SI acquisition when UE does not perform any non-SI measurement.

According to yet an embodiment, the second extended pre-defined time period or measurement delay for non-SI measurement is longer than the time period or measurement delay for non-SI measurement when UE does not acquire the SI.

According to an embodiment, the cell belongs to Evolved Universal Terrestrial Radio Access Network, E-UTRAN, and the relevant SIB is SIB1. The acquisition of the SI information comprises the decoding unit 1223 being adapted to decode a System Frame Number, SFN, of the E-UTRAN cell from the received MIB. The UE 1200 further comprises an identifying unit 1225 being adapted to identify one or more of cell global identity (CGI), closed subscriber group (CSG) indicator or CSG proximity detection of the target E-UTRAN cell from the received SIB1.

According to yet an embodiment, the cell belongs to UTRAN and the relevant SIB is SIB3. The acquisition of the SI information comprises the decoding unit 1223 being adapted to decode the SFN of the UTRAN cell from the received MIB. The UE 1200 further comprises an identifying unit 1225 being adapted to identify one or more of CGI, CSG indicator or CSG proximity detection of the target UTRAN cell from the received SIB3.

According to yet an embodiment, the at least one non-SI measurement belongs to any of the following measurement type or category:
  radio link monitoring (RLM),
  identification of PCI,
  RRM measurements,
  Mobility measurements,
  channel quality indicator, CSI, measurement,
  positioning measurements,
  self organizing network (SON) measurements, or
    minimization of drive tests (MDT) measurements.

According to an embodiment, the RRM measurement comprises a signal level measurement further comprising any one or more of:
  Reference Signal Received Power, RSRP,
  Reference Signal Received Quality, RSRQ,
  Common Pilot Indicator Channel, CPICH, Received Signal Code Power, RSCP, CPICH Ec (RSCP)/No (RSSI—Received Signal Strength Indicator),
UTRAN carrier RSSI
Global System for Mobile Communications, GSM, carrier RSSI,
High Rate Packet Data, HRPD, Pilot Strength, and Code Division Multiple Access 2000, CDMA2000, 1×RTT Pilot Strength According to still an embodiment, the acquisition unit 1222 further is adapted to perform the non-SI measurement in a measurement pattern.

According to an embodiment, the measurement pattern is one or more of restricted measurement pattern comprising restricted subframes used for one or more restricted measurements for enabling Enhanced Inter-cell Interference Coordination eICIC; and positioning occasion pattern comprising PRS subframes for positioning measurements, e.g., Reference Signal Time Difference, RSTD.

Figure 13:
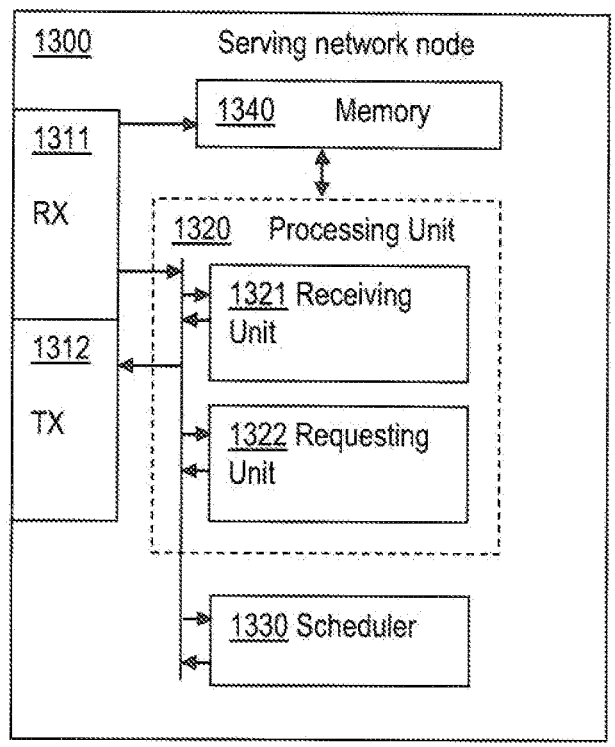
FIG. 13 is a block diagram of a serving network node adapted to configure measurements performed by a UE according to an embodiment.

According to an embodiment, the acquisition unit 1222 further is adapted to report the acquired SI to the serving cell FIG. 13 is a block diagram of a serving network node adapted to configure measurements performed by a UE according to an embodiment.

FIG. 13 illustrates the serving network node comprising a requesting unit 1322 adapted to request the UE to acquire system information, SI, of a cell during autonomous gaps created by the UE. The serving network node further comprises a scheduler 1330 adapted to schedule non-SI measurement subframes in order to avoid collision between the non-SI measurement subframes and the UE created autonomous gaps.

The serving network node 1300 is illustrated comprising a receiving arrangement 1311 and a transmitting arrangement 1312. These arrangements are simplified illustrations comprising e.g. an antenna arrangement and some processing capacity. The receiving and transmitting arrangements 1311 and 1312 are illustrated being able to communicate with a memory 1340 and a processing unit 1320. The processing unit 1320 is further being illustrated by a dashed box which in turn comprises a plurality of units adapted for certain purposes such as e.g. receiving and requesting. The serving network node 1300 is further illustrated comprising a scheduler 1330. The serving network node illustrated in FIG. 13 is to be considered an exemplifying illustration.

According to an embodiment, the serving network node 1300 further comprises a receiving unit 1321 adapted to receive, from the UE, before requesting the UE to acquire the SI of the cell, a capability information of the UE. The capability information indicates that the UE is capable of acquiring the SI of a cell during autonomous gaps created by the UE, and performing at least one non-SI measurement related to the serving and/or to one or more neighbour cells when acquiring the SI of the cell or in parallel with acquiring SI of the cell. The requesting unit 1322 further is adapted to request the UE to acquire the SI of the cell during autonomous gaps created by the UE and to perform at least one non-SI measurement on serving and/or one or more neighbouring cell if the UE capability indicates that it is capable of performing the SI and non-SI measurements in parallel.

According to an embodiment, the network node of the cell from which the UE is requested to acquire the SI is an Evolved Universal Terrestrial Radio Access Network, E-UTRAN, network node. The processing unit 1320 further is adapted to align the serving network node with the E-UTRAN network node by a pre-determined number of subframes before requesting the UE to acquire the SI of the cell during autonomous gaps created by the UE and to perform at least one non-SI measurement on serving and/or one or more neighbouring cell if the UE capability indicates that it is capable of performing the said SI and non-SI measurements in parallel.

Figure 14:
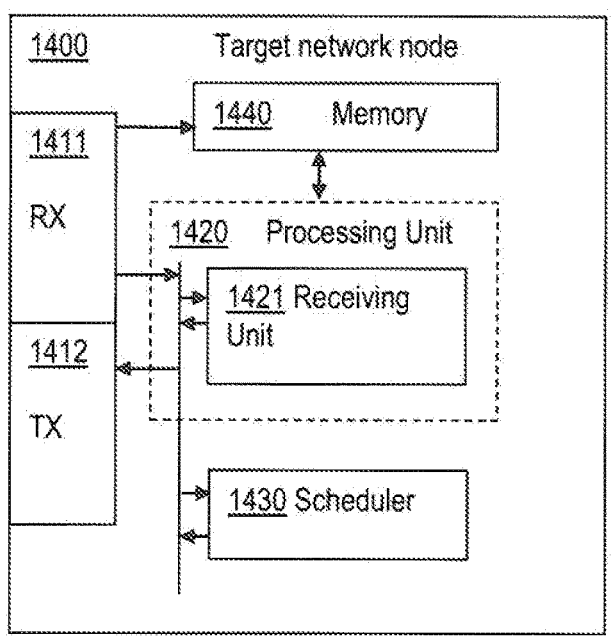
FIG. 14 is a block diagram of a target network node adapted to enable a UE to acquire SI according to an embodiment.

FIG. 14 is a block diagram of a target network node adapted to enable a UE to acquire SI according to an embodiment.

The target network node associated to a cell from which the UE is requested to acquire the SI is any one of: an UTRAN network node, E-UTRAN network node, GSM network node, CDMA2000 network node or multi-standard radio base station.

FIG. 14 illustrates the target network node comprising a receiving unit 1421 adapted to receive information that the UE may attempt to acquire a SIB and the target network node comprising a processing unit 1420 adapted to determine to minimise the impact of SIB scheduling on SI acquisition for the UE by using a single or a minimum number of segments to transmit the SIB, wherein if more than one segment is used to transmit the SIB, then the processing unit is adapted to transmit the segments at System Frame Number, SFN, offsets that enable the UE to catch up non-SI measurements in between; and/or using a SIB repetition period that enables the UE to catch up non-SI measurements in between reception of the SIB or segments thereof. The target network node may receive the said information from the serving network node over the interface between the serving and target network nodes e.g. over X2 interface between eNode Bs in LTE.

The embodiments described herein cover acquiring of any part of the SI, where CGI and SFN reading are particular examples. SFN reading may be performed for many purposes, e.g., for positioning when SFN of the reference cell is not known which may occur with Type 1 inter-frequency RSTD measurements (when the reference cell and the neighbour cells in the assistance data are not on the serving cell frequency)—in this case the UE may need to acquire the SFN prior starting positioning measurements. It should also be noted that in the embodiments described herein saying "performing in parallel reading of SI and non-SI measurement" may also be interpreted as overlapping of the two activities at least in part.

It shall further be pointed out that the serving network node may be any network node and thus the method performed in the serving network node may be performed in any corresponding network node. Merely as an example, the serving network node may be a positioning node such as e.g. an E-SMLC in LTE, or a SON node, an MDT node, an O&M node or OSS node.

It should be noted that FIGS. 12-14 merely illustrate various functional units in the UE, the serving network node and the target network node in a logical sense. The functions in practice may be implemented using any suitable software and hardware means/circuits etc. Thus, the embodiments are generally not limited to the shown structures of the UE, the serving network node and the target network node and the functional units. Hence, the previously described exemplary embodiments may be realised in many ways. For example, one embodiment includes a respective computer-readable medium having instructions stored thereon that are executable by the respective processing units for executing the method steps in the UE, the serving network node and the target network node respectively. The instructions executable by the computing system and stored on the computer-readable medium perform the method steps of the present invention as set forth in the claims.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a User Equipment, UE, for performing measurements in a wireless communication network, the method comprising:
    acquiring system information, SI, of a cell during autonomous gaps created by the UE during a first extended pre-defined time period or measurement delay for SI acquisition, wherein the first extended pre-defined time period or measurement delay for SI acquisition is longer than a time period or measurement delay for SI acquisition when the UE does not perform any non-SI measurements, and
    performing at least one non-SI measurement related to a serving and/or to one or more neighbour cells during a time period comprising said autonomous gaps.

2. The method according to claim 1, wherein acquiring the SI comprises receiving at least one of: a Master Information Block, MIB, and a System Information Block, SIB, of the cell.

3. The method according to claim 2, further comprising decoding the received MIB, wherein if the received MIB is not decoded successfully, the method comprises receiving a further MIB of the cell, decoding the received further MIB until a last received MIB is successfully decoded.

4. The method according to claim 1, wherein the method further comprises signalling a capability information to a network node, which capability information indicates that the UE is capable of:
    acquiring SI of a cell during autonomous gaps, and
    performing at least one non-SI measurement related to the serving and/or to one or more neighbour cells when acquiring the SI of the cell.

5. The method according to claim 4, further comprising receiving at least one of: a request from the network node to acquire the SI of the cell during autonomous gaps and a request to perform the at least one non-SI measurement on serving and/or one or more neighbouring cell if the UE capability information indicates that UE is capable of acquiring the SI of a cell and performing the at least one non-SI measurement.

6. The method according to claim 1, wherein the at least one non-SI measurement is performed during a second extended pre-defined time period or measurement delay for non-SI measurement.

7. The method according to claim 6, wherein the second extended pre-defined time period or measurement delay for non-SI measurement is longer than a time period or measurement delay for non-SI measurement when the UE does not acquire the SI.

8. The method according to claim 1, wherein the cell belongs to Evolved Universal Terrestrial Radio Access Network, E-UTRAN, and a relevant System Information Block, SIB, is SIB1, the acquiring of the SI information comprising the steps of:
    decoding a System Frame Number, SFN, of the E-UTRAN cell from a received Master Information Block, MIB, and
    identifying one or more of cell global identity, CGI, closed subscriber group, CSG, indicator or CSG proximity detection of the target E-UTRAN cell from a received SIB1.

9. The method according to claim 1, wherein the cell belongs to a Universal Terrestrial Radio Access Network, UTRAN, and a relevant System Information Block, SIB is SIB3, the acquiring of the SI information comprising the steps of:
    Decoding a System Frame Number, SFN, of the UTRAN cell from a received MIB, and
    identifying one or more of Cell Global Identity, CGI, Closed Subscriber Group, CSG indicator or CSG proximity detection of a target UTRAN cell from a received SIB3.

10. The method according to claim 1, wherein the at least one non-SI measurement belongs to any of the following measurement type or category:
    radio link monitoring, RLM,
    identification of Physical Cell Identity, PCI,
    Radio Resource Management, RRM, measurements,
    Mobility measurements,
    channel quality indicator, CQI, measurement,
    positioning measurements,
    self organizing network, SON, measurements, or
    minimization of drive tests, MDT, measurements.

11. The method according to claim 10, wherein the RRM measurement comprises a signal level measurement further comprising any one or more of:
    Reference Signal Received Power, RSRP,
    Reference Signal Received Quality, RSRQ,
    Common Pilot Indicator Channel, CPICH, Received Signal Code Power, RSCP,
    CPICH Ec (RSCP)/No (RSSI—Received Signal Strength Indicator),
    UTRAN carrier RSSI
    Global System for Mobile Communications, GSM, carrier RSSI,
    High Rate Packet Data, HRPD, Pilot Strength, and
    Code Division Multiple Access 2000, CDMA2000, 1×RTT Pilot Strength.

12. The method according to claim 1, wherein the non-SI measurement is performed in a measurement pattern.

13. The method according to claim 12, wherein the measurement pattern is one or more of:
    restricted measurement pattern comprising restricted subframes used for one or more restricted measurements for enabling Enhanced Inter-cell Interference Coordination (eICIC),
    positioning reference signal, PRS, measurement pattern comprising PRS subframes for positioning measurement, Reference Signal Time Difference, RSTD.

14. The method according to claim 1, further comprising reporting the acquired SI to the serving cell.

15. A User Equipment, UE, adapted to perform measurements in a wireless communication network, the UE comprising a processor and memory configured to:
    acquire system information, SI, of a cell during autonomous gaps created by the UE during a first extended pre-defined time period or measurement delay for SI acquisition, wherein the first extended pre-defined time period or measurement delay for SI acquisition is longer than a time period or measurement delay for SI acquisition when the UE does not perform any non-SI measurements, and perform at least one non-SI measurement related to a serving and/or to one or more neighbour cells during a time period comprising said autonomous gaps.

16. The UE according to claim 15, further configured to acquire the SI by receiving at least one of: a Master Information Block, MIB, and a System Information Block, SIB, of the cell.

17. The UE according to claim 16, further configured to decode the received MIB, wherein if the received MIB is not decoded successfully, receive a further MIB of the cell, decode the received further MIB until a last received MIB is successfully decoded.

18. The UE according to claim 15, further configured to signal a capability information to a network node, which capability information indicates that the UE is capable of:
acquiring SI of a cell during autonomous gaps, and
performing at least one non-SI measurement related to the serving and/or to one or more neighbour cells when acquiring the SI of the cell or in parallel with acquiring the SI of the cell.

19. The UE according to claim 18, further configured to receive a request from the network node for the UE to acquire the SI of the cell during autonomous gaps and to receive a request for the UE to perform at the least one non-SI measurement on serving and/or one or more neighbouring cell if the UE capability information indicates that UE is capable of acquiring the SI of a cell and performing the at least one non-SI measurement in parallel.

20. The UE according to claim 15, further configured to perform the at least one non-SI measurement during a second extended pre-defined time period or measurement delay for non-SI measurement.

21. The UE according to claim 20, wherein the second extended pre-defined time period or measurement delay for non-SI measurement is longer than a time period or measurement delay for non-SI measurement when UE does not acquire the SI.

22. The UE according to claim 15, wherein the cell belongs to Evolved Universal Terrestrial Radio Access Network, E-UTRAN, and a relevant System Information Block, SIB is SIB1, wherein the UE is further configured to:
decode a System Frame Number, SFN, of a E-UTRAN cell from a received Master Information Block, MIB, and
identify one or more of cell global identity, CGI, closed subscriber group, CSG indicator or CSG proximity detection of a target E-UTRAN cell from a received SIB1.

23. The UE according to claim 15, wherein the cell belongs to a Universal Terrestrial Radio Access Network UTRAN and a relevant System Information Block, SIB is SIB3, the acquisition of the SI information comprises the UE being configured to:
decode the SFN of a UTRAN cell from a received Master Information Block, MIB, and
identify one or more of Cell Global Identity, CGI, Closed Subscriber Group, CSG indicator or CSG proximity detection of a target UTRAN cell from a received SIB3.

24. The UE according to claim 15, wherein the at least one non-SI measurement belongs to any of the following measurement type or category:
radio link monitoring RLM,
identification of Physical Cell Identity, PCI,
Radio Resource Management, RRM, measurements,
Mobility measurements,
channel quality indicator, CQI, measurement,
positioning measurements,
self organizing network, SON, measurements, or
minimization of drive tests, MDT, measurements.

25. The UE according to claim 24, wherein the RRM measurement comprises a signal level measurement further comprising any one or more of:
Reference Signal Received Power, RSRP,
Reference Signal Received Quality, RSRQ,
Common Pilot Indicator Channel, CPICH, Received Signal Code Power, RSCP,
CPICH Ec (RSCP)/No (RSSI—Received Signal Strength Indicator),
UTRAN carrier RSSI
Global System for Mobile Communications, GSM, carrier RSSI,
High Rate Packet Data, HRPD, Pilot Strength, and
Code Division Multiple Access 2000, CDMA2000, 1×RTT Pilot Strength.

26. The UE according to claim 15, further configured to perform the non-SI measurement in a measurement pattern.

27. The UE according to claim 26, wherein the measurement pattern is one or more of:
restricted measurement pattern comprising restricted subframes used for one or more restricted measurements for enabling Enhanced Inter-cell Interference Coordination, eICIC,
positioning reference signal, PRS, measurement pattern comprising PRS subframes for positioning measurement, Reference Signal Time Difference, RSTD.

28. The UE according to claim 15, further configured to report the acquired SI to the serving cell.

29. A method in a User Equipment, UE, for performing measurements in a wireless communication network, the method comprising:
acquiring system information, SI, of a cell during autonomous gaps created by the UE, and
performing at least one non-SI measurement related to a serving and/or to one or more neighbour cells during a time period comprising said autonomous gaps and during a second extended pre-defined time period or measurement delay for non-SI measurement, wherein the second extended pre-defined time period or measurement delay for non-SI measurement is longer than a time period or measurement delay for non-SI measurement when the UE does not acquire the SI.

30. A User Equipment, UE, adapted to perform measurements in a wireless communication network, the UE comprising a processor and memory configured to:
acquire system information, SI, of a cell during autonomous gaps created by the UE, and
perform at least one non-SI measurement related to a serving and/or to one or more neighbour cells during a time period comprising said autonomous gaps and during a second extended pre-defined time period or measurement delay for non-SI measurement, wherein the second extended pre-defined time period or measurement delay for non-SI measurement is longer than a time period or measurement delay for non-SI measurement when the UE does not acquire the SI.

* * * * *

UNITED STATES PATENT AND TRADEMARK OFFICE
CERTIFICATE OF CORRECTION

PATENT NO. : 9,992,695 B2  
APPLICATION NO. : 14/124907  
DATED : June 5, 2018  
INVENTOR(S) : Axmon et al.

Page 1 of 1

It is certified that error appears in the above-identified patent and that said Letters Patent is hereby corrected as shown below:

In the Specification

In Column 4, Lines 54-55, delete "signals" and insert -- signals) --, therefor.

In Column 14, Line 32, delete "PC's" and insert -- PCIs --, therefor.

In the Claims

In Column 30, Line 7, in Claim 9, delete "SIB" and insert -- SIB, --, therefor.

In Column 31, Line 41, in Claim 22, delete "SIB" and insert -- SIB, --, therefor.

In Column 31, Line 51, in Claim 23, delete "SIB" and insert -- SIB, --, therefor.

In Column 31, Line 62, in Claim 24, delete "radio link monitoring" and insert -- radio link monitoring, --, therefor.

Signed and Sealed this  
Thirtieth Day of July, 2019

Andrei Iancu  
*Director of the United States Patent and Trademark Office*